United States Patent
Maes

(10) Patent No.: US 8,214,503 B2
(45) Date of Patent: Jul. 3, 2012

(54) FACTORING OUT DIALOG CONTROL AND CALL CONTROL

(75) Inventor: Stephane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 126 days.

(21) Appl. No.: 11/848,347

(22) Filed: Aug. 31, 2007

(65) Prior Publication Data

US 2008/0235380 A1   Sep. 25, 2008

Related U.S. Application Data

(60) Provisional application No. 60/896,676, filed on Mar. 23, 2007.

(51) Int. Cl.
  *G06F 15/16*   (2006.01)
(52) U.S. Cl. .................... 709/227; 709/203; 709/226
(58) Field of Classification Search .................. 709/203, 709/223, 226–228
  See application file for complete search history.

(56) References Cited

U.S. PATENT DOCUMENTS

| | | | |
|---|---|---|---|
| 5,414,812 A | 5/1995 | Filip et al. |
| 5,699,513 A | 12/1997 | Feigen et al. |
| 5,786,770 A | 7/1998 | Thompson |
| 5,850,517 A | 12/1998 | Verkler et al. |
| 5,867,665 A | 2/1999 | Butman et al. |
| 6,115,690 A | 9/2000 | Wong |
| 6,119,104 A | 9/2000 | Brumbelow |
| 6,128,645 A | 10/2000 | Butman et al. |
| 6,157,941 A | 12/2000 | Verkler et al. |
| 6,163,800 A | 12/2000 | Ejiri |
| 6,230,271 B1 | 5/2001 | Wadlow et al. |
| 6,272,556 B1 | 8/2001 | Gish |
| 6,275,857 B1 | 8/2001 | McCartney |
| 6,336,138 B1 | 1/2002 | Caswell et al. |
| 6,374,305 B1 | 4/2002 | Gupta et al. |
| 6,466,984 B1 | 10/2002 | Naveh et al. |
| 6,496,864 B1 | 12/2002 | McCartney |
| 6,553,108 B1 | 4/2003 | Felger |
| 6,578,159 B1 | 6/2003 | Kitagawa et al. |
| 6,611,812 B2 | 8/2003 | Hurtado et al. |

(Continued)

FOREIGN PATENT DOCUMENTS

EP   2 034 748 A1   3/2009

(Continued)

OTHER PUBLICATIONS

Burger, E. et al "Deploying CCXML for Application-Layer Call Control" Aug. 2006, 11 pages.*

(Continued)

*Primary Examiner* — David Lazaro
(74) *Attorney, Agent, or Firm* — Kilpatrick, Townsend & Stockton LLP

(57) ABSTRACT

Systems, methods, and machine-readable media are disclosed for providing session control and media exchange control that can include and combine, for example, call control and voice access concepts such as dialog (voice dialog, prompts and DTMF) or web/GUI elements. In one embodiment, a method of controlling a media session can comprise establishing a call via a signaling protocol, maintaining control of the call, and passing control of aspects of the call other than call control to a separate media processing module. The media processing module can comprise, for example, a dialog manager. In some implementations a voice access enabler providing a an abstract interface for accessing functions of the dialog controller.

61 Claims, 13 Drawing Sheets

U.S. PATENT DOCUMENTS

| | | |
|---|---|---|
| 6,748,570 B1 | 6/2004 | Bahrs et al. |
| 6,792,605 B1 | 9/2004 | Roberts et al. |
| 6,868,413 B1 | 3/2005 | Grindrod et al. |
| 6,978,348 B2 | 12/2005 | Belknap et al. |
| 6,985,939 B2 | 1/2006 | Fletcher et al. |
| 7,003,578 B2 | 2/2006 | Kanada et al. |
| 7,042,988 B2 | 5/2006 | Juitt et al. |
| 7,043,538 B2 | 5/2006 | Guedalia et al. |
| 7,073,055 B1 | 7/2006 | Freed et al. |
| 7,111,060 B2 | 9/2006 | Araujo et al. |
| 7,114,146 B2 | 9/2006 | Zhang et al. |
| 7,114,148 B2 | 9/2006 | Irving et al. |
| 7,143,092 B1 | 11/2006 | Arroyo et al. |
| 7,146,616 B2 | 12/2006 | Dorner et al. |
| 7,185,342 B1 | 2/2007 | Carrer et al. |
| 7,194,482 B2 | 3/2007 | Larkin et al. |
| 7,222,334 B2 | 5/2007 | Casati et al. |
| 7,272,625 B1 | 9/2007 | Hannel et al. |
| 7,302,570 B2 | 11/2007 | Beard et al. |
| 7,340,508 B1 | 3/2008 | Kasi et al. |
| 7,409,707 B2 | 8/2008 | Swander et al. |
| 7,411,943 B2 | 8/2008 | Kittredge et al. |
| 7,415,010 B1 | 8/2008 | Croak et al. |
| 7,426,381 B2 | 9/2008 | Maes |
| 7,433,838 B2 | 10/2008 | Welsh et al. |
| 7,447,793 B2 | 11/2008 | Morioka |
| 7,454,399 B2 | 11/2008 | Matichuk |
| 7,461,062 B2 | 12/2008 | Stewart et al. |
| 7,472,349 B1 | 12/2008 | Srivastava et al. |
| 7,519,076 B2 | 4/2009 | Janssen et al. |
| 7,580,994 B1 | 8/2009 | Fiszman et al. |
| 7,617,521 B2 | 11/2009 | Maes |
| 7,630,953 B2 | 12/2009 | Stauber et al. |
| 7,676,813 B2 | 3/2010 | Bisset et al. |
| 7,716,310 B2 | 5/2010 | Foti |
| 7,752,634 B1 | 7/2010 | Saxena et al. |
| 7,779,445 B2 | 8/2010 | Ellis |
| 7,853,647 B2 | 12/2010 | Maes |
| 7,860,490 B2 | 12/2010 | Maes |
| 7,865,607 B2 * | 1/2011 | Sonalkar et al. ............... 709/230 |
| 7,873,316 B2 | 1/2011 | Maes |
| 7,925,727 B2 | 4/2011 | Sullivan et al. |
| 8,032,920 B2 | 10/2011 | Maes |
| 8,073,810 B2 | 12/2011 | Maes |
| 8,090,848 B2 | 1/2012 | Maes |
| 2002/0002684 A1 | 1/2002 | Fox et al. |
| 2002/0087674 A1 | 7/2002 | Guilford et al. |
| 2002/0099738 A1 | 7/2002 | Grant |
| 2002/0101879 A1 | 8/2002 | Bouret |
| 2002/0111848 A1 | 8/2002 | White |
| 2002/0143819 A1 | 10/2002 | Han et al. |
| 2002/0144119 A1 | 10/2002 | Benatar |
| 2002/0178122 A1 | 11/2002 | Maes |
| 2002/0184373 A1 | 12/2002 | Maes |
| 2002/0191774 A1 | 12/2002 | Creamer et al. |
| 2002/0194388 A1 | 12/2002 | Boloker et al. |
| 2002/0198719 A1 | 12/2002 | Gergic et al. |
| 2002/0198991 A1 | 12/2002 | Gopalakrishnan et al. |
| 2003/0003953 A1 | 1/2003 | Houplain |
| 2003/0023953 A1 | 1/2003 | Lucassen et al. |
| 2003/0046316 A1 | 3/2003 | Gergic et al. |
| 2003/0061268 A1 | 3/2003 | Moerdijk et al. |
| 2003/0115203 A1 | 6/2003 | Brown et al. |
| 2003/0115260 A1 | 6/2003 | Edge |
| 2003/0131076 A1 | 7/2003 | Nelson et al. |
| 2003/0140131 A1 | 7/2003 | Chandrashekhar et al. |
| 2003/0154233 A1 | 8/2003 | Patterson |
| 2003/0191769 A1 | 10/2003 | Crisan et al. |
| 2003/0208539 A1 | 11/2003 | Gildenblat et al. |
| 2003/0217044 A1 | 11/2003 | Zhang et al. |
| 2003/0229760 A1 | 12/2003 | Doyle et al. |
| 2003/0229812 A1 | 12/2003 | Buchholz |
| 2004/0015547 A1 | 1/2004 | Griffin et al. |
| 2004/0015578 A1 | 1/2004 | Karakashian et al. |
| 2004/0024720 A1 | 2/2004 | Fairweather |
| 2004/0064528 A1 | 4/2004 | Meredith et al. |
| 2004/0068586 A1 | 4/2004 | Xie et al. |
| 2004/0110493 A1 | 6/2004 | Alvarez et al. |
| 2004/0128546 A1 | 7/2004 | Blakley et al. |
| 2004/0139319 A1 | 7/2004 | Favazza et al. |
| 2004/0153545 A1 | 8/2004 | Pandaya et al. |
| 2004/0161090 A1 | 8/2004 | Digate et al. |
| 2004/0176988 A1 | 9/2004 | Boughannam |
| 2004/0221005 A1 | 11/2004 | Albaugh et al. |
| 2005/0015340 A1 | 1/2005 | Maes |
| 2005/0021670 A1 | 1/2005 | Maes |
| 2005/0050194 A1 | 3/2005 | Honeisen et al. |
| 2005/0054287 A1 | 3/2005 | Kim |
| 2005/0073982 A1 | 4/2005 | Corneille et al. |
| 2005/0075115 A1 | 4/2005 | Corneille et al. |
| 2005/0086197 A1 | 4/2005 | Boubez et al. |
| 2005/0086297 A1 | 4/2005 | Hinks |
| 2005/0091156 A1 | 4/2005 | Hailwood et al. |
| 2005/0125696 A1 | 6/2005 | Afshar et al. |
| 2005/0132086 A1 | 6/2005 | Flurry et al. |
| 2005/0193269 A1 | 9/2005 | Haswell et al. |
| 2005/0228984 A1 | 10/2005 | Edery et al. |
| 2005/0239485 A1 | 10/2005 | Kundu et al. |
| 2005/0249190 A1 | 11/2005 | Birch |
| 2005/0249344 A1 | 11/2005 | Mueller et al. |
| 2005/0267979 A1 | 12/2005 | Bailey |
| 2006/0014688 A1 | 1/2006 | Costa et al. |
| 2006/0036689 A1 | 2/2006 | Buford et al. |
| 2006/0041669 A1 | 2/2006 | Bemmel et al. |
| 2006/0072474 A1 | 4/2006 | Mitchell |
| 2006/0080117 A1 | 4/2006 | Carr et al. |
| 2006/0104431 A1 | 5/2006 | Emery et al. |
| 2006/0116912 A1 | 6/2006 | Maes |
| 2006/0117109 A1 | 6/2006 | Maes |
| 2006/0143686 A1 | 6/2006 | Maes |
| 2006/0164902 A1 | 7/2006 | Fung |
| 2006/0165060 A1 | 7/2006 | Dua |
| 2006/0178898 A1 | 8/2006 | Habibi |
| 2006/0190600 A1 | 8/2006 | Blohm et al. |
| 2006/0210033 A1 | 9/2006 | Grech et al. |
| 2006/0212574 A1 | 9/2006 | Maes |
| 2006/0229078 A1 | 10/2006 | Itzkovitz et al. |
| 2006/0256774 A1 | 11/2006 | Rigaldies et al. |
| 2006/0272028 A1 | 11/2006 | Maes |
| 2006/0282856 A1 | 12/2006 | Errico et al. |
| 2006/0291507 A1 | 12/2006 | Sarosi et al. |
| 2007/0005770 A1 | 1/2007 | Kramer et al. |
| 2007/0011191 A1 * | 1/2007 | Otokawa et al. ............... 707/102 |
| 2007/0011322 A1 | 1/2007 | Moiso |
| 2007/0027975 A1 | 2/2007 | Tai et al. |
| 2007/0061397 A1 | 3/2007 | Gregorat et al. |
| 2007/0088836 A1 | 4/2007 | Tai et al. |
| 2007/0100831 A1 | 5/2007 | Cox |
| 2007/0100981 A1 | 5/2007 | Adamczyk et al. |
| 2007/0112574 A1 | 5/2007 | Greene |
| 2007/0118618 A1 | 5/2007 | Kisel et al. |
| 2007/0150480 A1 | 6/2007 | Hwang et al. |
| 2007/0150936 A1 | 6/2007 | Maes |
| 2007/0182541 A1 | 8/2007 | Harris et al. |
| 2007/0197227 A1 | 8/2007 | Naqvi et al. |
| 2007/0201376 A1 | 8/2007 | Marshall-Wilson |
| 2007/0203841 A1 | 8/2007 | Maes |
| 2007/0204017 A1 | 8/2007 | Maes |
| 2007/0233883 A1 | 10/2007 | De Lutiis et al. |
| 2007/0239866 A1 | 10/2007 | Cox et al. |
| 2007/0271554 A1 | 11/2007 | Fletcher et al. |
| 2007/0276907 A1 | 11/2007 | Maes |
| 2007/0280226 A1 * | 12/2007 | Sonalkar et al. ............... 370/389 |
| 2007/0291859 A1 | 12/2007 | Maes |
| 2008/0013533 A1 | 1/2008 | Bogineni et al. |
| 2008/0025243 A1 | 1/2008 | Corneille et al. |
| 2008/0080479 A1 | 4/2008 | Maes |
| 2008/0109853 A1 | 5/2008 | Einarsson et al. |
| 2008/0127232 A1 | 5/2008 | Langen et al. |
| 2008/0151768 A1 | 6/2008 | Liu |
| 2008/0151918 A1 | 6/2008 | Foti |
| 2008/0162637 A1 | 7/2008 | Adamczyk et al. |
| 2008/0168523 A1 | 7/2008 | Ansari et al. |
| 2008/0186845 A1 | 8/2008 | Maes |
| 2008/0189401 A1 | 8/2008 | Maes |
| 2008/0228919 A1 | 9/2008 | Doshi et al. |
| 2008/0232567 A1 | 9/2008 | Maes |

| | | |
|---|---|---|
| 2008/0235230 A1 | 9/2008 | Maes |
| 2008/0235327 A1 | 9/2008 | Maes et al. |
| 2008/0235354 A1 | 9/2008 | Maes |
| 2008/0275883 A1 | 11/2008 | Ashraf et al. |
| 2008/0288966 A1 | 11/2008 | Maes |
| 2008/0301135 A1 | 12/2008 | Alves et al. |
| 2008/0307108 A1 | 12/2008 | Yan et al. |
| 2009/0006360 A1 | 1/2009 | Liao et al. |
| 2009/0015433 A1 | 1/2009 | James et al. |
| 2009/0034426 A1 | 2/2009 | Luft et al. |
| 2009/0061404 A1 | 3/2009 | Atwal et al. |
| 2009/0112875 A1 | 4/2009 | Maes |
| 2009/0119303 A1 | 5/2009 | Rio et al. |
| 2009/0125595 A1 | 5/2009 | Maes |
| 2009/0132717 A1 | 5/2009 | Maes |
| 2009/0187919 A1 | 7/2009 | Maes |
| 2009/0190603 A1 | 7/2009 | Damola et al. |
| 2009/0193057 A1 | 7/2009 | Maes |
| 2009/0193433 A1 | 7/2009 | Maes |
| 2009/0201917 A1 | 8/2009 | Maes et al. |
| 2009/0228584 A1 | 9/2009 | Maes et al. |
| 2009/0306834 A1 | 12/2009 | Hjelm et al. |
| 2009/0328051 A1 | 12/2009 | Maes |
| 2010/0049640 A1 | 2/2010 | Maes |
| 2010/0049826 A1 | 2/2010 | Maes |
| 2010/0058436 A1 | 3/2010 | Maes |
| 2010/0077082 A1 | 3/2010 | Hession et al. |
| 2011/0125909 A1 | 5/2011 | Maes |
| 2011/0125913 A1 | 5/2011 | Maes |
| 2011/0126261 A1 | 5/2011 | Maes |
| 2011/0134804 A1 | 6/2011 | Maes |
| 2011/0142211 A1 | 6/2011 | Maes |
| 2011/0145278 A1 | 6/2011 | Maes |
| 2011/0182205 A1 | 7/2011 | Gerdes et al. |

FOREIGN PATENT DOCUMENTS

WO    WO 2007134468 A1    11/2007

OTHER PUBLICATIONS

Kim et al. "Implementation of Third Party Based Call Control Using Parlay Network API in SIP Environment" ICOIN 2003, LNCS 2662, 2003, pp. 416-425.*
Romellini, C. et al. "CCXML: The Power of Standardization", Loquendo, Sep. 27, 2005.*
U.S. Appl. No. 11/951,500, filed Dec. 6, 2007, Office Action mailed Sep. 22, 2009, 24 pages.
U.S. Appl. No. 11/951,500, filed Dec. 6, 2007, Final Office Action mailed Mar. 30, 2010, 26 pages.
U.S. Appl. No. 11/877,129, filed Oct. 23, 2007, Office Action mailed Sep. 28, 2009, 15 pages.
U.S. Appl. No. 11/877,129, filed Oct. 23, 2007, Final Office Action mailed Mar. 29, 2010, 17 pages.
U.S. Appl. No. 11/926,738, filed Oct. 29, 2007, Office Action mailed Feb. 24, 2010, 12 pages.
U.S. Appl. No. 11/943,101, filed Nov. 20, 2007, Office Action mailed Jul. 8, 2009, 9 pages.
U.S. Appl. No. 11/943,101, filed Nov. 20, 2007, Final Office Action mailed Feb. 2, 2010, 9 pages.
U.S. Appl. No. 11/943,101, filed Nov. 20, 2007, Advisory Action mailed Apr. 16, 2010, 3 pages.
U.S. Appl. No. 12/019,299, filed Jan. 24, 2008, Office Action mailed Mar. 31, 2010, 13 pages.
U.S. Appl. No. 11/024,160, filed Dec. 2004, Maes.
Andrews, Tony et al, Business Process Execution Language for Web Services, Version 1.1, BEA Systems, International Business Machines Corporation, SAP AG, Siebel Systems, May 5, 2003, 31 pages.
Liberty Architecture Overview, Liberty Alliance Project Version 1.1, Piscataway New Jersey, Jan. 15, 2003, 44 pages.
Maes, Stephanie, Multi-modal Browser Architecture. Overview on the support of multi-modal browsers in 3GPP, IBM Research Mobile Speech Solutions and Conversational Multi-modal Computing, downloaded http://www.w3.org on May 26, 2003, 25 pages.
Maes, Stephanie, Multi-modal Web IBM Position W3C/WAP Workshop, IBM Research Human Language Technologies, downloaded http://www.w3.org on May 26, 2003, 9 pages.
Parlay APIs 4.0, Parlay X Web Services White Paper, The Parlay Group, Parlay X Working Group, Dec. 16, 2002, 12 pages.
Policy-Based Management Tom Sheldon's Linktionary, downloaded http://www.linktionary.com/policy.html on Aug. 2, 2004, 4 pages.
Seely, Scott, "XML and Web Services Security: Understanding WS-Security", Microsoft Corporation, 2002.
Simpson et al, Java Product Review—Oracle EDA Suite, Dec. 4, 2006, Open Source Magazine, pp. 1-10.
Single Sign on Deployment Guide, Introduction to Single-Sign-On, Netscape 6 Documentation Training Manual http://developer.netscape.com/docs/manuals/security/SSO/sso.htm on May 26, 2003, 5 pages.
Sundsted, Todd E., with Liberty and single sign-on for all, The Liberty Alliance Project seeks to solve the current online identity crisis Java World, downloaded www.javaworld.com/javaworld/jw-02-2002/jw-0215-liberty.html on May 26, 2003, 7 pages.
Thomas Manes, Anne, "Registering a Web Service in UDDI", 2003.
U.S. Appl. No. 11/877,129, filed Oct. 23, 2007, Advisory Action mailed Jun. 3, 2010, 2 pages.
U.S. Appl. No. 11/877,129, filed Oct. 23, 2007, Notice of Allowance mailed Aug. 5, 2010, 6 pages.
U.S. Appl. No. 11/926,738, filed Oct. 29, 2007, Final Office Action mailed Jun. 29, 2010, 12 pages.
U.S. Appl. No. 11/951,500, filed Dec. 6, 2007, Advisory Action mailed Jun. 24, 2010, 2 pages.
U.S. Appl. No. 10/855,999, filed May 28, 2004, Advisory Action dated Feb. 16, 2010, 3 pages.
U.S. Appl. No. 10/855,999, filed May 28, 2004, Advisory Action dated Feb. 2, 2009, 3 pages.
U.S. Appl. No. 10/855,999, filed May 28, 2004, Final Office Action dated Nov. 19, 2008, 12 pages.
U.S. Appl. No. 10/855,999, filed May 28, 2004, Final Office Action dated Nov. 23, 2009, 19 pages.
U.S. Appl. No. 10/855,999, filed May 28, 2004, Office Action dated Apr. 15, 2009, 13 pages.
U.S. Appl. No. 10/855,999, filed May 28, 2004, Office Action dated May 1, 2008, 9 pages.
U.S. Appl. No. 10/855,999, filed May 28, 2004, Office Action dated Jun. 24, 2010, 20 pages.
U.S. Appl. No. 11/070,317, filed Mar. 1, 2005, Advisory Action dated May 19, 2009, 3 pages.
U.S. Appl. No. 11/070,317, filed Mar. 1, 2005, Final Office Action dated Feb. 2, 2010, 8 pages.
U.S. Appl. No. 11/070,317, filed Mar. 1, 2005, Final Office Action dated Mar. 4, 2009, 16 pages.
U.S. Appl. No. 11/070,317, filed Mar. 1, 2005, Office Action dated Apr. 30, 2010, 9 pages.
U.S. Appl. No. 11/070,317, filed Mar. 1, 2005, Office Action dated Aug. 18, 2009, 21 pages.
U.S. Appl. No. 11/070,317, filed Mar. 1, 2005, Office Action dated Aug. 5, 2008, 18 pages.
U.S. Appl. No. 11/130,636, filed May 16, 2005, Notice of Allowance mailed Aug. 18, 2010, 4 pages.
U.S. Appl. No. 11/130,636, filed May 16, 2005, Office Action dated Mar. 23, 2010, 6 pages.
U.S. Appl. No. 11/130,636, filed May 16, 2005, Office Action dated Sep. 18, 2009, 13 pages.
U.S. Appl. No. 12/045,220, filed Mar. 10, 2008, Advisory Action dated Jun. 11, 2010, 3 pages.
U.S. Appl. No. 12/045,220, filed Mar. 10, 2008, Final Office Action dated Apr. 2, 2010, 19 pages.
U.S. Appl. No. 12/045,220, filed Mar. 10, 2008, Office Action dated Oct. 2, 2009, 18 pages.
U.S. Appl. No. 11/943,101, filed Nov. 20, 2007, Office Action mailed Aug. 27, 2010, 11 pages.
U.S. Appl. No. 11/951,500, filed Dec. 6, 2007, Office Action mailed Sep. 1, 2010, 30 pages.
U.S. Appl. No. 12/019,299, filed Jan. 24, 2008, Final Office Action mailed Oct. 6, 2010, 20 pages.
U.S. Appl. No. 10/856,588, filed May 28, 2004, Advisory Action dated Jan. 5, 2010, 3 pages.
U.S. Appl. No. 10/856,588, filed May 28, 2004, Final Office Action dated Oct. 15, 2008, 11 pages.

U.S. Appl. No. 10/856,588, filed May 28, 2004, Final Office Action dated Oct. 20, 2009, 17 pages.
U.S. Appl. No. 10/856,588, filed May 28, 2004, Notice of Allowance dated Sep. 23, 2010, 8 pages.
U.S. Appl. No. 10/856,588, filed May 28, 2004, Office Action dated Mar. 16, 2009, 10 pages.
U.S. Appl. No. 10/856,588, filed May 28, 2004, Office Action dated Apr. 11, 2008, 16 pages.
U.S. Appl. No. 11/024,160, filed Dec. 27, 2004, Advisory Action dated Feb. 18, 2010, 3 pages.
U.S. Appl. No. 11/024,160, filed Dec. 27, 2004, Final Office Action dated Oct. 15, 2010, 11 pages.
U.S. Appl. No. 11/024,160, filed Dec. 27, 2004, Final Office Action dated Dec. 3, 2009, 11 pages.
U.S. Appl. No. 11/024,160, filed Dec. 27, 2004, Final Office Action dated Feb. 11, 2009, 9 pages.
U.S. Appl. No. 11/024,160, filed Dec. 27, 2004, Office Action dated Jun. 29, 2009, 9 pages.
U.S. Appl. No. 11/024,160, filed Dec. 27, 2004, Office Action dated Jun. 9, 2010, 10 pages.
U.S. Appl. No. 11/024,160, filed Dec. 27, 2004, Office Action dated Aug. 22, 2008, 8 pages.
U.S. Appl. No. 11/070,317, filed Mar. 1, 2005, Final Office Action dated Sep. 27, 2010, 8 pages.
U.S. Appl. No. 11/123,468, filed May 5, 2005, Advisory Action dated Feb. 17, 2010, 3 pages.
U.S. Appl. No. 11/123,468, filed May 5, 2005, Final Office Action dated Nov. 24, 2009, 19 pages.
U.S. Appl. No. 11/123,468, filed May 5, 2005, Office Action dated Apr. 10, 2009, 17 pages.
U.S. Appl. No. 11/123,468, filed May 5, 2005, Office Action dated Apr. 14, 2010, 16 pages.
U.S. Appl. No. 11/123,468, filed May 5, 2005, Final Office Action dated Nov. 10, 2010, 18 pages.
U.S. Appl. No. 11/123,471, filed May 5, 2005, Notice of Allowance dated Jun. 29, 2009, 6 pages.
U.S. Appl. No. 11/123,471, filed May 5, 2005, Office Action dated Jan. 23, 2009, 8 pages.
U.S. Appl. No. 11/939,705, filed Nov. 14, 2007, Office Action mailed Oct. 4, 2010, 21 pages.
Maretzke, Michael, "JAIN SLEE Technology Overview", <http://www.maretzke.de/pub/lectures/jslee_overview_2005/JSLEE_Overview_2005.pdf>, Apr. 12, 2005, 26 pages.
O'Doherty, Phelim, "JSLEE—SIP Servlet", <http://java.sun.com/products/jain/JSLEE-SIPServlet.pdf, 2003, 13 pages.
The Parlay Group, "Specifications", <http://web.archive.org/web/20050114014707/www.parlay.org/specs/index.asp>, Jan. 14, 2005, 2 pages.
U.S. Appl. No. 11/926,738, filed Oct. 29, 2007, Advisory Action mailed Sep. 3, 2010, 2 pages.
U.S. Appl. No. 11/926,738, filed Oct. 29, 2007, Office Action mailed Nov. 10, 2010, 12 pages.
U.S. Appl. No. 12/019,299, filed Jan. 24, 2008, Advisory Action dated Dec. 9, 2010, 3 pages.
U.S. Appl. No. 12/019,299, filed Jan. 24, 2008, Office Action mailed Jan. 24, 2011, 16 pages.
U.S. Appl. No. 10/855,999, filed May 28, 2004, Final Office Action dated Jan. 5, 2011, 19 pages.
U.S. Appl. No. 11/123,468, filed May 5, 2005, Advisory Action dated Jan. 18, 2011, 2 pages.
U.S. Appl. No. 12/364,642, filed Feb. 3, 2009, Office Action dated Dec. 20, 2010, 18 pages.
U.S. Appl. No. 11/357,653, filed Feb. 16, 200, Office Action dated Jan. 20, 2011, 18 pages.
Wikipedia, "Parlay", <http://web.archive.org/web/20050130172632/en.wikipedia.org/wiki/Parlay>, Jan. 30, 2005, 3 pages.
Wikipedia, "Object-Oriented Programming", <http://web.archive.org/web/20051211141918/http://en.wikipedia.org/wiki/Object-oriented_programming>, Dec. 11, 2005, 10 pages.
Wikipedia, "OSI model", <http://web.archive.org/web/20050907132012/http://en.wikipedia.org/wiki/Osi_model>, Sep. 7, 2005, 8 pages.

International Search Report and Written Opinion of PCT/US2010/037074 mailed Jun. 1, 2011, 16 pages.
U.S. Appl. No. 11/926,738, filed Oct. 29, 2007, Final Office Action mailed Mar. 17, 2011, 13 pages.
U.S. Appl. No. 11/926,738, filed Oct. 29, 2007, Advisory Action mailed May 25, 2011, 3 pages.
U.S. Appl. No. 11/943,101, filed Nov. 20, 2007, Final Office Action mailed Feb. 14, 2011, 11 pages.
U.S. Appl. No. 11/943,101, filed Nov. 20, 2007, Advisory Action mailed Apr. 28, 2011, 3 pages.
U.S. Appl. No. 11/951,500, filed Dec. 6, 2007, Final Office Action mailed Apr. 14, 2011, 33 pages.
U.S. Appl. No. 10/855,999, filed May 28, 2004, Advisory Action dated Mar. 16, 2011, 3 pages.
U.S. Appl. No. 11/024,160, filed Dec. 27, 2004, Office Action dated Feb. 7, 2011, 11 pages.
U.S. Appl. No. 11/024,160, filed Dec. 27, 2004, Final Office Action dated Jun. 1, 2011, 11 pages.
U.S. Appl. No. 11/939,705, filed Nov. 14, 2007, Final Office Action mailed Mar. 17, 2011, 21 pages.
U.S. Appl. No. 12/019,335, filed Jan. 24, 2008, Office Action mailed May 23, 2011, 18 pages.
U.S. Appl. No. 12/544,459, filed Aug. 20, 2009, Office Action mailed Mar. 2, 2011, 10 pages.
U.S. Appl. No. 12/544,484, filed Aug. 20, 2009, Office Action dated Jun. 3, 2011, 6 pages.
U.S. Appl. No. 11/969,343, filed Jan. 4, 2008, Office Action mailed Jun. 10, 2011, 13 pages.
U.S. Appl. No. 11/926,738, filed Oct. 29, 2007, Notice of Allowance mailed Aug. 5, 2011, 13 pages.
U.S. Appl. No. 11/943,101, filed Nov. 20, 2007, Office Action mailed Jul. 28, 2011, 11 pages.
U.S. Appl. No. 11/951,500, filed Dec. 6, 2007, Advisory Action mailed Jul. 15, 2011, 3 pages.
U.S. Appl. No. 11/024,160, filed Dec. 27, 2004, Notice of Allowance dated Aug. 4, 2011, 15 pages.
U.S. Appl. No. 11/939,705, filed Nov. 14, 2007, Office Action mailed Sep. 28, 2011, 15 pages.
U.S. Appl. No. 12/045,220, filed Mar. 10, 2008, Office Action dated Sep. 27, 2011, 20 pages.
U.S. Appl. No. 12/364,642, filed Feb. 3, 2009, Final Office Action dated Jul. 1, 2011, 20 pages.
U.S. Appl. No. 12/364,642, filed Feb. 3, 2009, Advisory Action dated Sep. 16, 2011, 3 pages.
U.S. Appl. No. 11/357,653, filed Feb. 16, 2006, Final Office Action dated Aug. 2, 2011, 19 pages.
U.S. Appl. No. 12/544,459, filed Aug. 20, 2009, Notice of Allowance mailed Aug. 22, 2011, 8 pages.
U.S. Appl. No. 11/949,930, filed Dec. 4, 2007, Office Action mailed Sep. 29, 2011, 19 pages.
U.S. Appl. No. 12/014,387, filed Jan. 15, 2008, Office Action mailed Sep. 7, 2011, 18 pages.
U.S. Appl. No. 12/018,718, filed Jan. 23, 2008, Office Action mailed Jun. 22, 2011, 23 pages.
U.S. Appl. No. 12/019,299, filed Jan. 24, 2008, Final Office Action mailed Aug. 25, 2011, 20 pages.
Author Unknown, "Assuring Quality of Experience for IPTV—White Paper," Heavy Reading, Jul. 2006, 18 pages.
Author Unknown, "LTE Mobile Transport Evolution - Strategic White Paper," Alcatel Lucent, accessed Jan. 10, 2012 from http://lte.alcatel-lucent.com/locale/en_us/downloads/Alcatel-Lucent_LTE_Transport_WhitePaper.pdf, 2011, 16 pages.
Dhesikan, "Quality of Service for IP Videoconferencing—Engineering White Paper," Cisco Systems Jun. 1, 2001, 16 pages.
U.S. Appl. No. 11/943,101, filed Nov. 20, 2007, Notice of Allowance mailed Dec. 9, 2011, 7 pages.
U.S. Appl. No. 12/019,335, filed Jan. 24, 2008, Final Office Action mailed Dec. 5, 2011, 19 pages.
U.S. Appl. No. 12/364,642, filed Feb. 3, 2009, Office Action dated Oct. 18, 2011, 21 pages.

U.S. Appl. No. 11/357,653, filed Feb. 16, 2006, Advisory Action dated Oct. 12, 2011, 3 pages.
U.S. Appl. No. 12/544,471, filed Aug. 20, 2009, Office Action dated Jan. 6, 2012, 8 pages.
U.S. Appl. No. 12/544,484, filed Aug. 20, 2009, Final Office Action dated Dec. 1, 2011, 8 pages.
U.S. Appl. No. 11/969,343, filed Jan. 4, 2008, Final Office Action mailed Oct. 21, 2011, 11 pages.
U.S. Appl. No. 11/969,343, filed Jan. 4, 2008, Advisory Action mailed Jan. 5, 2012, 3 pages.

* cited by examiner

FACTORING OUT DIALOG CONTROL AND CALL CONTROL

CROSS-REFERENCES TO RELATED APPLICATIONS

This application claims the benefit of U.S. Provisional Application Ser. No. 60/896,676, filed Mar. 23, 2007 by Maes and entitled "A Call Control Driven MVC Programming Model for Mixing Web and Call or Media Applications," the entire disclosure of which is incorporated herein by reference.

BACKGROUND OF THE INVENTION

Embodiments of the present invention relate generally to electronic communications. More particularly embodiments of the present invention relate to providing control of a media exchange within a communication session.

Various methods and systems have been established for providing control of a call or other electronic communication and control of a dialog within that call, such as provided by an Interactive Voice Response (IVR) system for example. Furthermore, different standards and proprietary programming models are being established to support description of call control, description of signaling, and description of dialog systems. For example, dialogs can be described with Voice eXtensible Markup Language (Voice XML or VXML), Speech Application Language Tags (SALT), etc. Call control can be achieved with Parlay X or other high level Application Program Interfaces (APIs) and/or Call Control XML (CCXML). Functions for implementing call control can be realized in Session Initiation Protocol (SIP), e.g., SIP Servlet container as described in Java Specification Request (JSR) 116, Parlay or IN. Signaling may be done in SIP, H323, IN, Parlay Call control, IN, etc. Public Branch eXchanges (PBXes) and IP PBXes may also perform call control functions.

Voice gateways (e.g. VoiceXML browsers) and CCXML browsers are focused on providing IVR systems with PBX functions or switches and embedded client implementation (for VoiceXML). This model works well for "IVR Models" or initial call routing models where VoiceXML and CCXML are supported by the gateway (integrated) or between the gateway and the client and SIP or another supporting protocol is solely used to implement the signaling part or the interaction between the two. In such a case, the call controller simply routes the incoming call to the appropriate dialog server.

However, this model does not work very well where application logic runs in a separate server like a SIP servlet container, J2EE (with high level call control APIs), Parlay, etc. and provides some functionality other than solely providing initial call control/routing and IVR functions like, for example, driving other applications as part of the call processing before or after the dialog. For example, VoiceXML today explicitly mixes dialog and call control while CCXML limits its usefulness to switch functions. Furthermore, combination of VoiceXML and CCXML is not formalized other than as an XML modularization exercise. Today, there are no clear ways on how converged applications (i.e. those mixing web and call control paradigms) can be built while being call control centric, i.e., written as a web application that drives call control flows. Hence, there is a need for improved methods and systems for controlling a media exchange such as a voice dialog within a communication session.

BRIEF SUMMARY OF THE INVENTION

Systems, methods, and machine-readable media are disclosed for providing session control and media exchange control that can include and combine, for example, call control and voice access concepts such as dialog (voice dialog, prompts and DTMF) or web/GUI elements. In one embodiment, a method of controlling a media session can comprise establishing a call via a signaling protocol, maintaining control of the call, and passing control of aspects of the call other than call control to one or more media processing modules.

Establishing the call can be performed in response to receiving a request to initiate the call via the signaling protocol from an initiating endpoint. In other cases, establishing the call can be performed based on logic of an application maintaining control of the call. The application maintaining control of the call can establish the call by performing one or more call control functions. For example, the one or more call control functions can comprise establishing a connection with the media processing module via third-party call control. In some cases, the media processing can be performed by an endpoint. For example, when a call is established to start performing dialog management, the media processing can be the dialog manger (e.g. IVR or Voice XML GW). In another example, such as when redirecting the call after completion of the dialog management, then the media processing can be any type of end point to who the call or media is redirected such as a user agent for a human interaction (e.g. person to person call at the end). Passing control of aspects of the call other than call control to the media processing module can comprise requesting execution of a process of the media processing module via an Application Program Interface (API) of the media processing module.

According to one embodiment, the one or more media processing modules may comprise a voice access enabler responsible for the inclusion of dialog management in a call flow. Furthermore, the one or more media processing modules can comprise a dialog manager. For example, the dialog manager can comprise a Voice eXtensible Markup Language (VoiceXML) gateway, an Interactive Voice Response (IVR) system, etc. Requesting execution of a process of the media processing module can comprise requesting execution of a dialog by the dialog manager. Requesting execution of the dialog by the dialog manager can comprise sending a message to the dialog manager via the signaling protocol that identifies the dialog in a header of the message. Alternatively, a dialog associated with a port through which execution of the dialog is requested or a pre-loaded dialog may be executed. Requesting execution of the dialog by the dialog manager may also include sending an indication of the dialog to be performed by the dialog manager as well as receiving updates of the state of the dialog after the session or call has been established with the dialog manager. In one embodiment, the Voice Access enabler does not provide call control. In another embodiment, the voice access enabler can provide the call control functions to bring the end point in session/call with the dialog manager or media processor.

The API of the voice access enabler can, for example, provide access to a function for interacting with a human user participating in the call via dialog management (e.g. a VoiceXML application or IVR script). In another example, the API of the voice access enabler can provide access to a function for providing voice prompts to participants in the call. Additionally or alternatively, the API of the voice access enabler can provide access to a Text-To-Speech (TTS) function. In yet another example, the API of the voice access enabler can provide access to a Automatic Speech Recognition (ASR) function. Additionally or alternatively, the API of the voice access enabler can provide access to a function for performing Dual-Tone Multi-Frequency (DTMF) detection and recognition.

The method can further comprise the dialog manager or other media processing module collecting information from an endpoint participating in the session or call and updating a state of the media used in or supporting the call based on the information from the endpoint. The application or the voice access enabler can put the end point in a call or session with the media processor and cause the dialog manager to collect data via a exchange of information in the media (e.g. dialog management, prompt collect, etc.) then can receive the information collected from the endpoint participating in the call from the dialog manager. The application may then perform additional call control based on the information collected from the endpoint participating in the call. Performing additional call control can be performed by the application maintaining control of the call performing one or more call control functions. For example, such call control functions can include but are not limited to sending the call or end point to another processor, to another end point or to terminal the call, etc.

According to another embodiment, a system can comprise a communication network and a media processing module communicatively coupled with the communication network. The system can also include an application server communicatively coupled with the communication network. The application server can execute an application adapted to establish a communication session on the communication network via a signaling protocol, maintain control of the communication session, and pass control of aspects of the communication session other than call control to the media processing module.

The system can further comprise an initiating endpoint communicatively coupled with the communication network. The application can be adapted to establish the communication session in response to receiving a request to initiate the communication session via the signaling protocol from the initiating endpoint or based on other processing. In either case, the application can be adapted to establish the communication session by performing one or more call control functions. For example, the one or more call control functions can include establishing a connection with the media processing module via third-party call control.

The system can further comprise a voice access enabler communicatively coupled with the communication network. The voice access enabler can provide an Application Program Interface (API), i.e., a northbound API. In such a case, the application can pass control of aspects of the call other than call control to the media processing module by requesting execution of a process of the media processing module via the API of the voice access enabler. The API of the voice access enabler can provide access to a function of the media processing module for interacting with a human user participating in the call. For example, the API of the voice access enabler can provide access to a function for providing voice prompts to participants in the call, a Text-To-Speech (TTS) function, an Automatic Speech Recognition (ASR) function, a function for performing Dual-Tone Multi-Frequency (DTMF) signaling, etc. When the voice access enabler includes bringing the end point in session/call with the voice access enabler, the APIs may also provide ways to indicate which media processor to use if more than one media processing module is available.

The separate media processing module can comprise a dialog manager. For example, the dialog manager can comprise a Voice eXtensible Markup Language (VoiceXML) gateway, an Interactive Voice Response (IVR) system, etc. Requesting execution of a process of the separate media processing module can comprise requesting execution of a dialog by the dialog manager. For example, the application can request execution of the dialog by the dialog manager by sending a message to the dialog manager via the signaling protocol that identifies the dialog in a header of the message. Alternatively, the dialog manager can be adapted to execute a dialog associated with a port through which the application requests execution of the dialog or can execute a pre-loaded dialog. Alternatively, after establishment of the call or session, the application can pass the details of the dialog or updates to the state of the dialog. It should be understood that, when using the voice access enabler, this can be abstracted or hidden through the northbound APIs of the voice access enabler. If the voice access enabler does not include the initial invite/call control functions to put the end point and media processor together in a call or session, the application can be made aware of how to do that if the invite includes the dialog details (e.g. address of the dialog).

An endpoint communicatively coupled with the communication network can participate in the communication session with the media processing module. The media processing module can be further adapted to collect information from the endpoint and update a state of media utilized in the communication session based on the information from the endpoint. The application can be further adapted to receive the information collected from the endpoint from the media processing module, for example, via the API of the voice access enabler. The application may then perform additional call control based on the information collected from the endpoint participating in the call.

According to yet another embodiment, a method of programming an application to control a media session can comprise programming the application to establish a call via a signaling protocol, programming the application to maintain control of the call, and programming the application to pass control of aspects of the call other than call control to a separate media processing module.

Establishing the call can be performed in response to receiving a request via the signaling protocol from an initiating endpoint to initiate the call. In other cases, establishing the call can be performed based on logic of an application maintaining control of the call. The application maintaining control of the call can establish the call by performing one or more call control functions. For example, the one or more call control functions can comprise establishing a connection with the media processing module via third-party call control. Requesting one or more call control functions can comprise establishing a connection with the media processing module via, for example, third-party call control. Furthermore, passing control of aspects of the call other than call control to the media processing module can comprise requesting execution of a process of the media processing module via an Application Program Interface (API) of a voice access enabler.

According to one embodiment, a voice access enabler can be provided that abstracts interaction with the media processor or dialog manager to pass the dialog details and collect the result. This may or may not include bringing the initial call control. That is, the voice access enabler can provide the initial invite to initiate the call or session. Then, when the call is received by the application, the call details (e.g. call identifier) can be pass by application to the voice access enabler so that it can be redirected to the media process module or dialog manager, for example, via third party call control. In other cases, when the voice access enabler does not provide the initial invite, the application can either initiate the call between the media processor and end point or react to the incoming call and redirect it in third part call control to the media processor. The application can then pass to the voice access enabler the details of the media processor such as an identifier, address, etc.

The separate media processing module can comprise a dialog manager. For example, the dialog controller comprises a Voice eXtensible Markup Language (VoiceXML) gateway, an Interactive Voice Response (IVR) system, etc. Requesting execution of a process of the separate media processing module can comprise requesting execution of a dialog by the dialog manager. Requesting execution of the dialog by the dialog manager can comprise sending a message to the dialog manager via the signaling protocol that identifies the dialog in a header of the message. Alternatively, a dialog associated with a port through which execution of the dialog is requested or a pre-loaded dialog may be executed. Alternatively, after establishment of the call or session, the application can pass the details of the dialog and/or receive updates to the state of the dialog to or from the dialog manager or other media processing module. It should be understood that other methods of passing this information and/or requesting execution of a dialog can be used depending upon the exact implementation and should be considered within the scope of the present invention.

The voice access enabler can provide an Application Program Interface (API), i.e., a northbound API. In such a case, the application can pass control of aspects of the call other than call control to the media processing module by requesting execution of a process of the media processing module via the API of the voice access enabler. The API of the voice access enabler can provide access to a function of the media processing module for interacting with a human user participating in the call. For example, the API of the voice access enabler can provide access to a function for providing voice prompts to participants in the call, a Text-To-Speech (TTS) function, an Automatic Speech Recognition (ASR) function, a function for performing Dual-Tone Multi-Frequency (DTMF) signaling, etc. When the voice access enabler includes bringing the end point in session/call with the voice access enabler, the APIs may also provide ways to indicate which media processor to use if more than one media processing module is available.

The media processing module can collect information from an endpoint participating in the call and updating a state of the media used in or supporting the call based on the information from the endpoint. The method can further comprising programming the application to receive from the media processing module information collected from the endpoint participating in the call and programming the application to perform additional call control based on the information collected from the endpoint.

Stated another way, according to embodiments of the present invention, an application can be programmed to use call control to establish calls or other media sessions and bring end points into a session with one or more media processing modules such as a dialog manager that performs media processing but does not perform call control. The application can collect results of the dialog or session and then update the state of the dialog or session or use call control to trigger other processing. In some embodiments, this can be done using a voice access enabler to abstract connection of the end point and media processor in a session and/or load dialog and/or collect results.

DETAILED DESCRIPTION OF THE INVENTION

Figure 1:
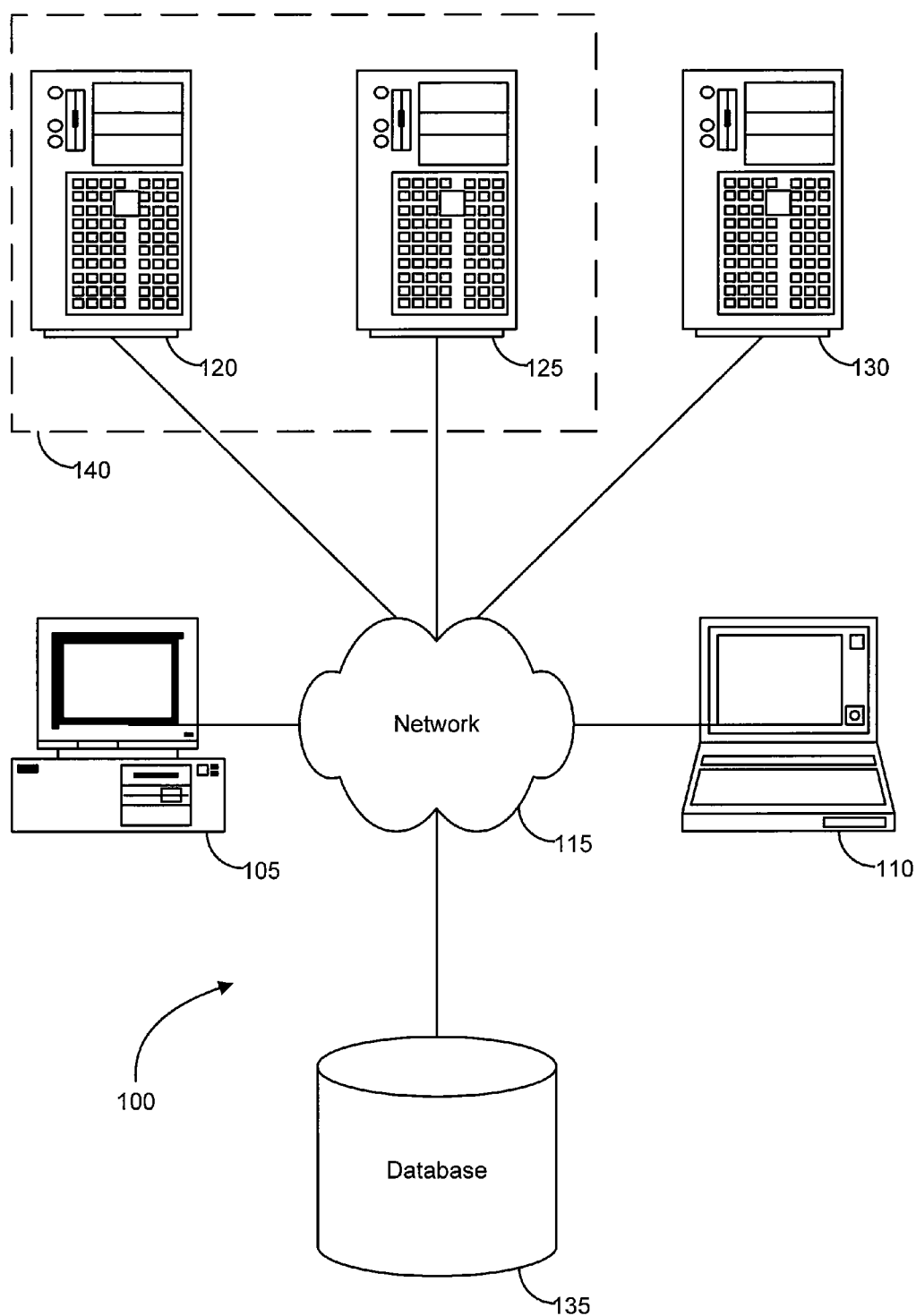
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form. Importantly, it should be noted that while described herein with reference to SIP and Parlay, embodiments of the present invention are considered to be equally applicable to other protocols (e.g. IN, CAMEL, PSTN, etc.) and should not be considered limited to use with SIP or Parlay. For example, the interface of the voice access enabler described in detail below may use some Parlay or other interfaces to allow, for example, setting of a prompt or collection of a number. That is, while Parlay UI (User Interaction) does not provide a voice access enabler as will be described, it can provide a standard northbound interface that the voice access enabler may use. However, as will be seen, the voice access enabler further abstracts the technology realization in a way that Parlay does not provide and it factors out call control from the dialog management. Furthermore, embodiments of the present invention are thought to be equally applicable to other signaling protocols and other dialog manager technologies.

It should also be noted that, while described herein with regard to a voice call and dialog exchange, the embodiments of the invention are transposable to any multimedia sessions or exchanges, not just a voice call. In other cases, embodiments of the present invention can provide a multimedia session that can be directed to a generic processor (instead of VoiceXML gateway/dialog manager) that interacts with the media and extracts data then returns a result to the invoking or controlling application that then decides how to processed. The multimedia session may be supported by SIP or another protocol. The media stream may be Real-time Transport Protocol (RTP), Real-Time Streaming Protocol (RTSP), Message Session relay Protocol (MSRP), or another protocol. Session control and media may be separated or combined.

As used herein, the term "enabler" refers to a reusable service layer component or components that provide an intrinsic function for use by other enablers, applications (i.e. services) or any authorized resource through appropriate northbound interfaces. Intrinsic means that an enabler does not itself provide functions provided by other enablers nor functions based on service provider policies (e.g. messaging does not include authentication, charging, logging, etc.). These functions may be implemented by network resources, devices or OSS/BSS functions (e.g. rating, charging, balance tracking). An enabler can access these resources and/or functions via any mechanism appropriate for the resource. That is, a southbound interface is not specified as part of the adapter, so it can be changed from resource to resource. However, northbound interfaces provided by an enabler may be standardized.

Generally speaking, embodiments of the present invention provide a programming model. The basic programming model follows a Model View Control (MVC) paradigm where a controller is utilized by the logic that drives the media session. Call control operations are factored out from other interactions done on or with the media, e.g., the call. Accordingly, a call or other media interaction can be either received by an application or initiated by an application. In the former case, the application logic can react to the call as appropriate while maintaining control of the call. In the latter case, the application can establish a call while keeping it under control. Both cases can be implemented by third-party call control where the application remains an intermediary to all the call control exchanges and makes each leg believe that the application is the other end point.

Either in reaction to the call or when initiating the call, the application can forward the call in third party call control to a media processing module responsible for processing the call. Throughout the processing of the call by the media processing module or upon completion of the processing by it, the application can receive updates from the media processing module. At some point, the application can determine that the call can be processed by another module. The process can be repeated until the call is terminated or handed over to another application to handle any further processing. At any time, such a media processing module may involve a call established with a human target. In such a case, determination of a next module or processing the results can be based on action taken by the target. For example, processing the results can include a call center operator providing data collected from the caller or requesting particular call processing (e.g. call forwarding, call hold, conferencing with others, etc.). Following the principles of the proposed programming model, the modules need not perform call control operations. These operations can instead be performed by the application logic. Therefore, call control can be factored out from dialog operations and an enabler, e.g., a voice access enabler as described herein, can be responsible for providing the application interfaces and abstraction of technology that can perform the dialog management operation, e.g., a dialog manager as described herein.

Embodiments of the present invention provide methods, systems and machine-readable media for providing control of a media exchange based on this model as well as tools to develop or deploy applications according to this model. Generally speaking, embodiments of the present invention provide for session control and media exchange control that can include and combine, for example, call control and voice access concepts such as dialog (voice dialog, prompts and DTMF) or web/GUI elements.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA3000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server or other application server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java, C, C# or C++, and/or any scripting language, such as Perl, Python, or TCL, as well as combinations of any programming/scripting languages. The server(s) may also include database servers, including without limitation those commercially available from Oracle, Microsoft, Sybase, IBM and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

As noted above, control of a communication session according to various embodiments of the present invention can comprise receiving a call or other exchange, for example by an application server implemented on a web server or other system as described above, from an initiator, such as one of the computers 105, 110, 115, 125, 130 described above or another device, via a signaling protocol. In other cases, an application of the application server can initiate the exchange. In either case, a dialog manager or other media processing module can be invited to participate in the call via the signaling protocol (e.g. as call control or as multi-party or third party call control). After inviting the dialog manager, control of the call can be maintained by the application or application server and control of the dialog can be passed to the dialog manager. According to one embodiment, control of the dialog can be passed to the dialog manager via a voice access manager providing an abstract northbound API for invoking functions of or interacting with the dialog manager. State information can be received from the dialog manager containing information collected by the dialog manager, e.g., through the dialog. This information, can be passed back or made available to the application or application server, for example, via the voice access enabler API. In some cases, one or more rules or other logic can be applied by the application or application server to the information collected. Additional call control can be performed by the application or application server based on applying the one or more rules to the information collected from the initiator or based on other processing by the application.

Figure 2:
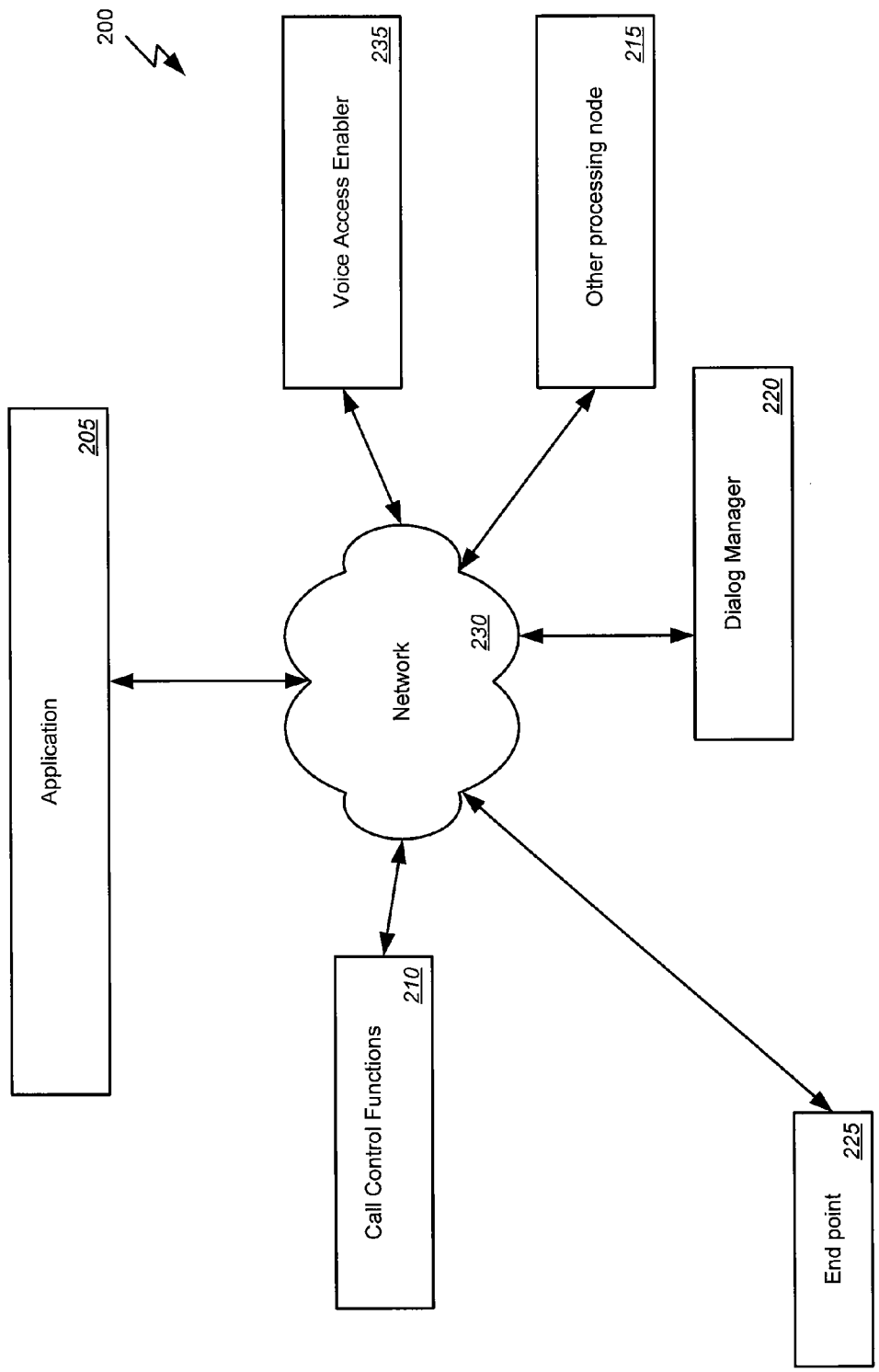
FIG. 2 is a block diagram illustrating, at a high-level, functional components of a system for providing call and dialog control according to one embodiment of the present invention.

FIG. 2 is a block diagram illustrating, at a high-level, functional components of a system for providing call and dialog control according to one embodiment of the present invention. In this example, a system 200 for performing call control can comprise a communications network 230 and a dialog manager 220 communicatively coupled with the communications network 230. An initiating device or endpoint 225 can be communicatively coupled with the communications network 230. The initiating endpoint 225 can be adapted to initiate a communication session over the communications network 230 via a signaling protocol, such as, for example, SIP. As described here, signaling is separated from the media exchanges. However, as can be understood by one skilled in the art, such separation is not required. Rather embodiments of the present invention can also be implemented in cases where the signaling and media exchanges are combined.

The application 205 can receive and process the communication. In other cases, rather than reacting to a communication from the initiating device or endpoint 225, the application may initiate the communication with the endpoint 225. In either case, based on the application logic, the application 205 can perform call control. According to one embodiment, the application 205 can perform call control by requesting functions for interacting with other elements of the system provided by a set of call control functions 210.

A set of call control functions 210 can be adapted to receive a request to perform call control from the application 205, for example via the signaling protocol. Generally speaking, the call control functions 210 can provide call control in third-party or multi-party mode for voice or multimedia. This control can be provided for either a specific network technology or independently of the underlying network technology. It should be understood that, while illustrated here as a separate component or module, the call control functions 210 can be implemented as part of the application 205 or another element of the system 200. Via the call control functions 21, the application 205 can maintain control of the call and connect the dialog manager 220 or other media processing module(s) with the session and request execution of a dialog by the dialog manager 220. Alternatively or additionally, the application 205 may request processing, other than call control, from another processing node 215 or application (not shown here).

In some cases, the dialog manager 220 can comprise a voice eXtensible Markup Language (XML) gateway or browser. In another example, the dialog manager 220 can comprises an IVR or component other than a VoiceXML browser but provides similar functionality. In some cases, rather than using VoiceXML the dialog manager 220 can a proprietary script language. The application 205, via the call control functions 210, can request execution of a dialog by the dialog manager 220 by, for example, sending an invite message to the dialog manager 220 via the signaling protocol. The invite message can identify, for example, in a header of the invite message, a URL of a voice XML page to use for the dialog. Alternatively, a pre-configure VoiceXML port or address accessed or requested can be associated with an application, instance, or page to load. In some cases, the page to load or to be used by the dialog controller can be provided by the application. In other cases, the page can be preloaded in the dialog controller. Sometimes it can be uploaded after the call is established or updated during the dialog. The dialog manager 220 can be adapted to collect information from a user, i.e., the user of the initiating endpoint 225, and update a state of the dialog based on the information from the user.

The system can also include a voice access enabler 235. The voice access enabler 235 can provide an Application Program Interface (API), i.e., a northbound API. In such a case, the application 205 can pass control of aspects of the call other than call control to the dialog manager 220 or other media processing module by requesting execution of a process of the dialog manager 220 via the API of the voice access enabler. The API of the voice access enabler 235 can provide access to a function of the dialog manager 220 for interacting with a human user participating in the call. For example, the API of the voice access enabler 235 can provide access to a function for providing voice prompts to participants in the call, a Text-To-Speech (TTS) function, an Automatic Speech Recognition (ASR) function, a function for performing Dual-Tone Multi-Frequency (DTMF) signaling, etc.

The voice access enabler 235 can be further adapted to receive from the dialog manager 220 the information collected from the user by the dialog manager 220 and return it to the application 205. In some cases, the application 205, via the call control functions 210, can then perform additional call control based on the information collected from the user. It should be noted that, in other implementations, more, fewer, or different components may be used to perform the same functions.

Figure 3:
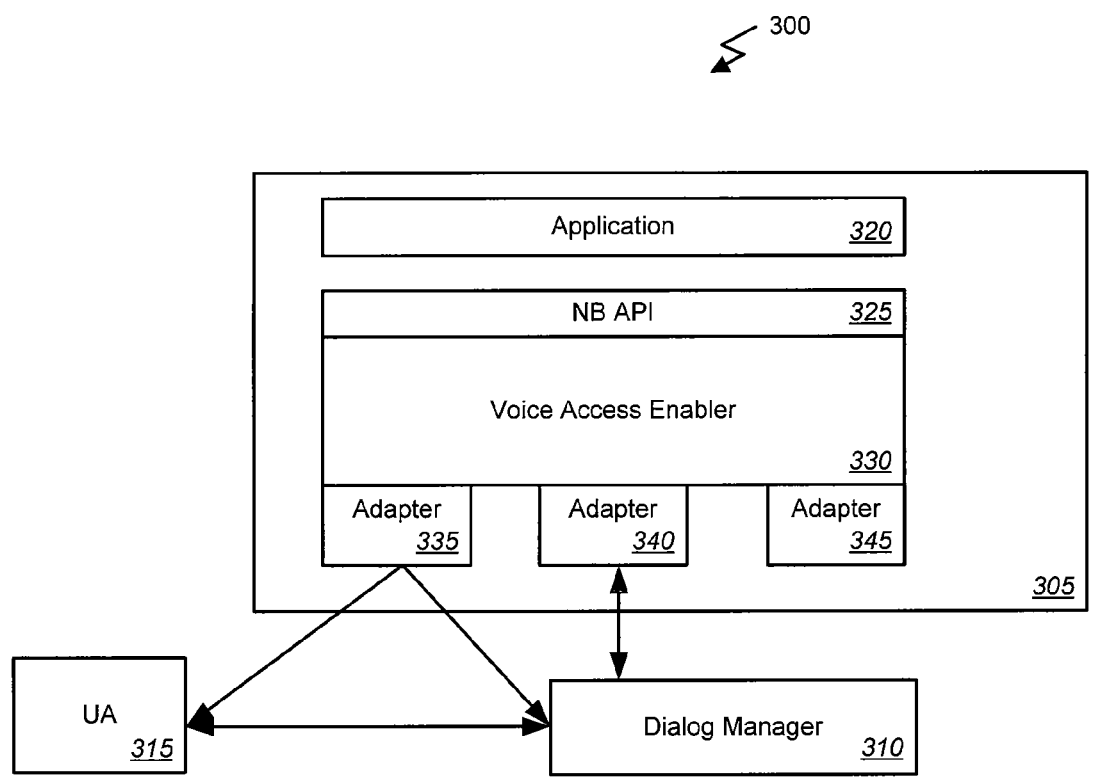
FIG. 3 is a block diagram illustrating details of a voice access enabler according to one embodiment of the present invention.

FIG. 3 is a block diagram illustrating details of a voice access enabler according to one embodiment of the present invention. As illustrated here, an application 320 and a voice access enabler 330 can be implemented, for example, on an application server 305 or other system operating, for example, J2EE. The voice access enabler 330 can comprise one or more northbound APIs or other interfaces 325 providing an abstract interface for invoking one or more of a plurality of functions of a dialog manager 310 or other media processing module. The northbound APIs 325 of the voice access enabler 330 can receive requests for functions of the dialog manager 310 from the application 320. Via the northbound APIs 325 the application 320 can pass dialog that needs to take place (e.g. VoiceXML page, set of VXML pages or URL) and receive the result of the dialog.

The voice access enabler 330 can also include one or more southbound interfaces or adapters 335-345. The adapters 335-345 can provide an interface specific to the dialog manager 310 or other media processing module and/or user agents 315. For example, the adapters 335-345 of the voice access enabler 330 can comprise one or more adapters to connect to a VoiceXML gateway, IVR, or media server responsible for passing the dialog to the IVR, getting the results of the dialog (collected information) and, in some embodiments, to bring the call or session to the dialog manager 310. More specifically, the voice access enabler 330 may drive via its southbound adapters 335-345 any combination of things to support dialog management including but not limited to a Voice XML gateway (e.g. via HTTP+SIP and different addressing mechanisms in invite to select voiceXML page like Netann, SIP: VXML, pre assigning the page to an address, pushing the page after the call is established), a legacy IVR (e.g. via JCA 1.5), DTMF collectors/recognizers, announcement servers, Parlay GWs driving resources like announcement servers, DTMF recognizers, IVRs (e.g. Via JAC 15.5 adapters), PBX and IP PBX connected to dialog manager etc (e.g. via JCA 1.5 or SIP connected to PIMG GW), media servers that provide some form of dialog management, prompt playing, DTF recognition (e.g. via MSML, MOML, MSCML, MSCP, MGCP, etc.)

As noted above, the application can pass control of aspects of the call other than call control to the media processing module by requesting execution of a process of the media processing module via the API of the voice access enabler. The API of the voice access enabler can provide access to a function of the media processing module for interacting with a human user participating in the call. For example, the API of the voice access enabler can provide access to a function for providing voice prompts to participants in the call, a Text-To-Speech (TTS) function, an Automatic Speech Recognition (ASR) function, a function for performing Dual-Tone Multi-Frequency (DTMF) signaling, etc.

Figure 4:
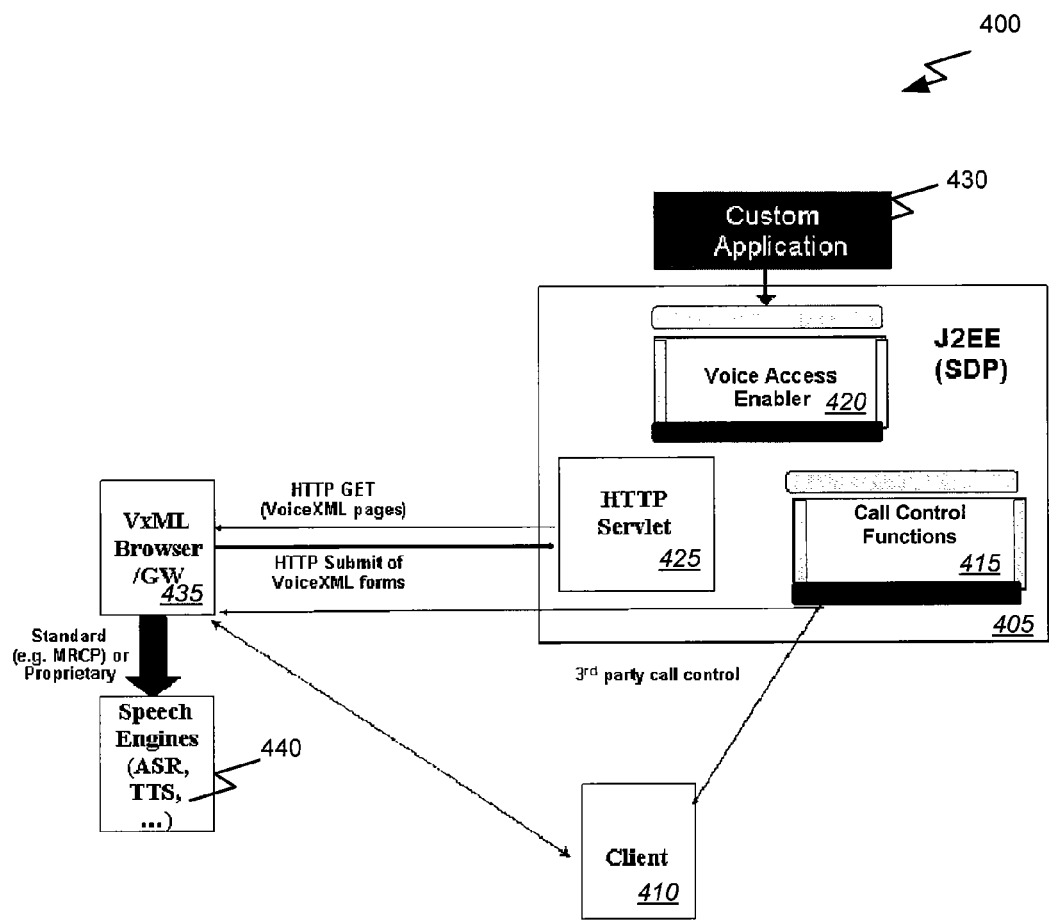
FIG. 4 is a block diagram illustrating additional details of one implementation of a system for providing call and dialog control according to one embodiment of the present invention.

FIG. 4 is a block diagram illustrating additional details of one implementation of a system for providing call and dialog control according to one embodiment of the present invention. In this example, the system 400 includes an application server 405. The application server 405 includes call control functions 415. The call control functions 415 can be adapted to receive a request to perform call control from the application. The request from the application 430 may be made based on a communication to the application 430 from another device, such as a client 410, or based on other processing performed by the application 430.

According to one embodiment, the application server 405 may also include a voice access enabler 420. The voice access enabler 420 can provide dialog interaction with user of the client 410 and/or the application 430. For example, the voice access enabler 420 can provide voice prompts, Text-To-Speech (TTS) and/or Automated Speech Recognition (ASR) processing, DTMF, play prompt/announcement, music, etc. and other functions such as the VXML browser or gateway 435 or an TVR may provide. More specifically, the voice access enabler 420 can provide a programming interface to: pass a dialog to manage (e.g. a VoiceXML page or set of VoiceXML pages identified as discussed above); manage a call in third-party call control mode to direct the call to the dialog manager 435; support and/or control the dialog; handle errors; and receives results (and stop or return other pages).

According to one embodiment, the voice access enabler 420 can be independent of the technology used for the dialog controller 435. So, for example, a request for a dialog from the application 430 can be directed to a preconfigured VoiceXML gateway or other dialog controller 435 instead of requiring the voice access enabler 420 to indicate a page to load. In some cases, the voice access enabler 420 can be adapted to transform requests to other languages than VoiceXML such as SALT, X+V, other XML, TVR scripts, etc. and control Voice gateway, TVR, or other dialog manager. In some such cases, requesting the dialog manager 435 to load a dialog or page and getting results in return may be based on proprietary protocols (i.e. other than HTTP/XML). In some cases, adapters may be used to, for example, an TVR or a Parlay gateway that drives the IVR.

So, in use, the application 430, can maintain control of the call. It should be noted that control of the call does not need to involve the voice access enabler 420. Rather, the call control can be done outside the voice access enabler 420 by the application 430. The application 430 can then request execution of a dialog via the voice access enabler 420. For example, the application 430 can maintain control of the call, and make a request to the voice access enabler 420 to perform a particular dialog and may perform call control, for example via the call control functions 415. The call control functions 415 can in turn establish a call with the VXML browser or gateway 435 in third-party or multi-party call control between the call control functions 415, the VXML browser or gateway 435, and the client 410. Establishing the call can include the call control functions 415 providing an identification of a dialog to be executed by the VXML browser or gateway 435. For example, the call control functions 415, via the HTTP servlet 425, can send an HTTP GET request identifying one or more VXML pages to be executed.

As noted above, in other cases the voice access enabler 420 may optionally provide the initial invite. In such a case, the application may determine how to appropriately invite/initiate a call between the dialog manager and the caller. This may change depending on how the invite may be involved in passing/determining the VoiceXML page that should be played.

The VXML browser or gateway 435 can be adapted to collect information from a user of the client 410 and update a state of the dialog based on the information from the user. For example, the VXML browser or gateway 435 may utilize any of a number of speech engines 440 or other modules to support the dialog with the client 410. It should be understood that, in some embodiments, rather than VXML browser or gateway 435, other than a VoiceXML browser may be used. For example, any IVR with any IVR programming language and control protocol can be used in place of the VXML browser or gateway 435.

The application 430 can be further adapted to receive from the dialog manager, for example via the voice access enabler 420, the information collected from the user by the dialog manager. For example, the VXML browser or gateway 435 can provide to the voice access enabler 420 of the application server 405, via the HTTP servlet 425 a HTTP SUBMIT of one or more VXML forms or other information including information collected from the user of the client 410 through the dialog. In some cases, the application may perform additional call control, for example via the call control functions 415, and/or request another dialog, for example via the voice access enabler 420, based on the information collected from the user and provided by the VXML browser or gateway 435.

Therefore, in use, the voice access enabler 420 can request a resource like a VoiceXML gateway to play a prompt and/or media supporting a dialog. Additionally or alternatively, the voice access enabler 420 may request a resource like a VoiceXML gateway to record a dialog, run a dialog, collect data though dialog etc. Supported dialogs can include voice or DTMF dialogs such as may be provided by an IVR or the VXML browser or gateway 435. Such dialogs may be pre-configured, i.e., assigned to an address associated with the application 430, dynamically configured, i.e., the call and the dialog can be dynamically bound, or can be based on the collected dialog outcome.

Figure 5:
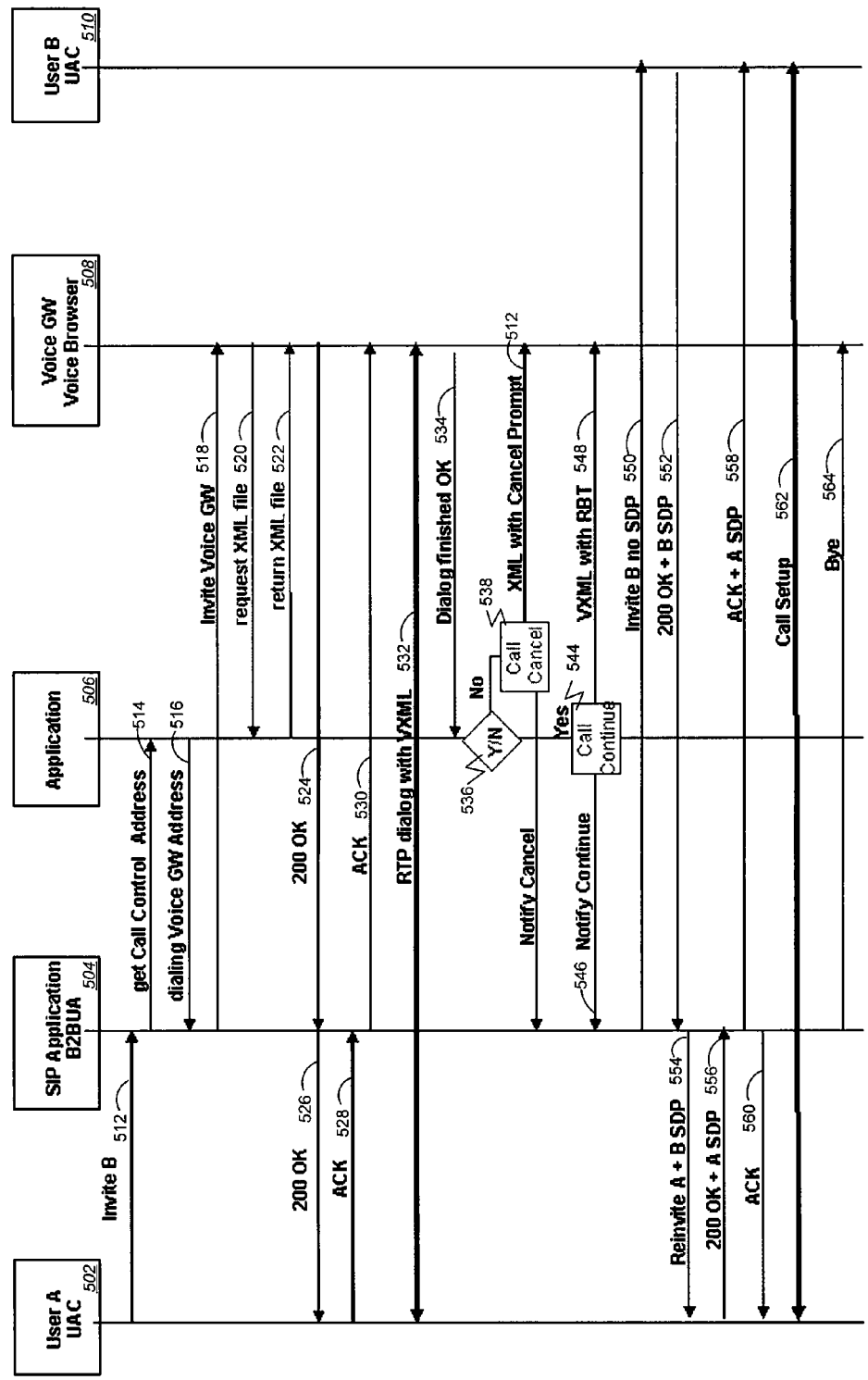
FIG. 5 is a chart illustrating a process for providing call and dialog control according to one embodiment of the present invention.

FIG. 5 is a chart illustrating a process for providing call and dialog control according to one embodiment of the present invention. This figure illustrates an example of SIP signaling flow in the absence of a voice access enabler. In this example, user A 502 calls user B 510 and is redirected by the application 506 to a dialog manager 508. Upon completion of a dialog (e.g. checking who the person is by getting a PIN or code etc) the call is forwarded to user B 510.

More specifically, as illustrated in FIG. 5 user A 502, i.e., a user agent on a user device, can initiate 512 a call or other session, for example through a SIP application 504, that can in turn can request 514 an address of the dialog manager 508 from another application 506. The application 506 can return 516 the address of the dialog manager 508 to the SIP application 504 which in turn can invite 518 the dialog manager 508 to join the call. The dialog manager 508 can request 520 and the application 506 can return an XML file or otherwise indicate the dialog to be played by the dialog manager 508. The dialog manager 508 can then accept 524 and 526 the invitation to join the call. User A 502 can the acknowledge 528 and 530 the call and user A 502 and the dialog manager 508 can conduct the dialog 532, for example via RTP or other protocol.

Once the dialog is completed, the dialog manager 508 can inform 534 the application 506 which can then determine 536 whether additional to continue the call. If the application 506 determines 536 to cancel 538 the call, e.g., user A was not authenticated, the application can send cancellation messages to the dialog manager 508 and SIP application 504. If the application determines 536 to continue 544 the call, e.g., user A was authenticated, the application can send notifications 546 and 548 to the SIP application 504 and the dialog manager 508. The SIP application 504 can in turn send a second invite message 550 to user B 510, i.e. a user agent on a device, to join the call. User B 510 can in turn send an acceptance message 552 to the SIP application 504 that in turn can re-invite 554 to join the call, now with user B. User A 502 can in turn send an acceptance message 556 to the SIP application 504 that then sends acknowledgements 558 and 560 to user A 502 and user B 510. User A and user B can then proceed to setup 562 and conduct the call while the SIP application terminates 564 the call with the dialog manager 508.

Figure 6:
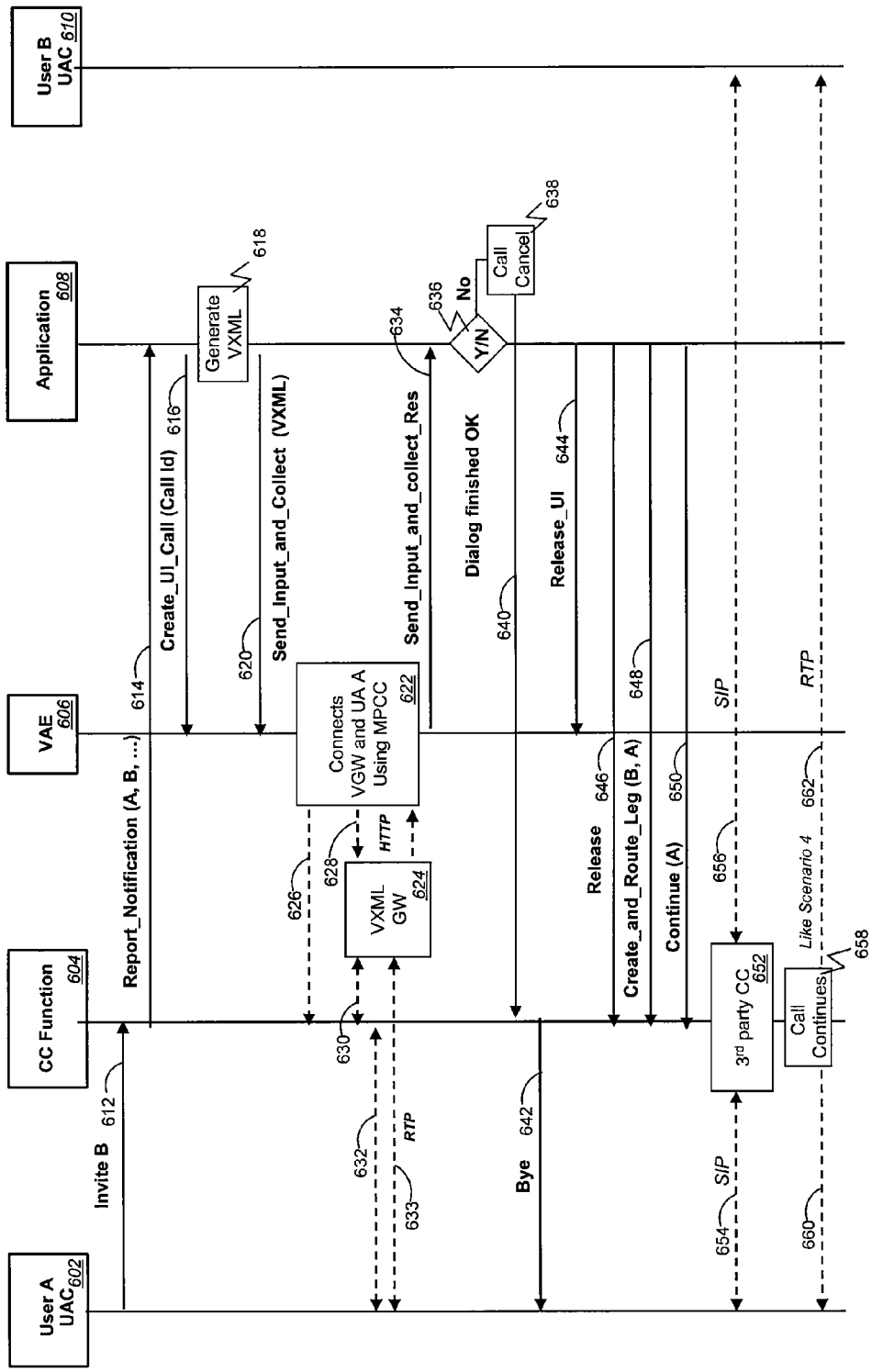
FIG. 6 is a chart illustrating a process for providing call and dialog control according to another embodiment of the present invention.

FIG. 6 is a chart illustrating a process for providing call and dialog control according to another embodiment of the present invention. This figure illustrates an example of SIP signaling flow in the case where a voice access enabler 606 is used. In the example illustrated in FIG. 6, user A 602, i.e., a user agent on a device, can initiate a call, for example, by sending an invite message 612 to a call control functions 604. The call control functions 604 can in turn send a notification of the call to an application 608 to support the call. The application 608 can create the call, send an indication 616 of the ID of the call to the voice access enabler, generate 618 VXML to be handled by the voice access enabler 606, and send the VXML 620 to the voice access enabler 606. It should be noted that, in this example, it is assumed that the VXML is passed to the voice access enabler 606. In other cases, a URL can be passed. In other cases, e.g., when playing a simple prompt and collecting a response, the page or dialog to be played can be passed through an API as a prompt and collect structure and the voice access enabler 606 can create the voice XML to support this dialog. The voice access enabler 606 can in turn connect 622 the voice gateway 624 and user A 602, for example, via HTML requests 628 to the voice gateway 624 and by requesting the call control functions 604 to connect 630 and 632 the voice gateway 624 and user A 602 via multi-party call control. Once connected, user A can conduct the dialog with the voice gateway, for example via RTP 633.

Once the dialog is completed, the voice access enabler 622 can inform 634 the application 608 which can then determine 636 whether to continue the call. If the application 608 determines 636 to cancel 638 the call, e.g., user A was not authenticated, the application 608 can generate 638 and send a completion message 640 to the call control functions 604 which in turn can disconnect 642 or terminate the call with user A 602. If the application 608 determines 636 to continue the call, e.g., user A was authenticated, the application 608 can send release messages 644 and 646 to the voice access enabler 606 and call control function 604, request 648 creation of a new call leg by the call control functions 604, and request 650 continuation of the call by the call control functions 604. The call control functions 604 can in turn invite 654 and 656 user A and user B via third-party call control to participate in the new leg of the call. Upon acceptance by user A and user B, the call control functions 604 can support continuation 658 of the call, e.g., by supporting an exchange 660 and 662 between user A and user B via RTP or other protocol.

Figure 7:
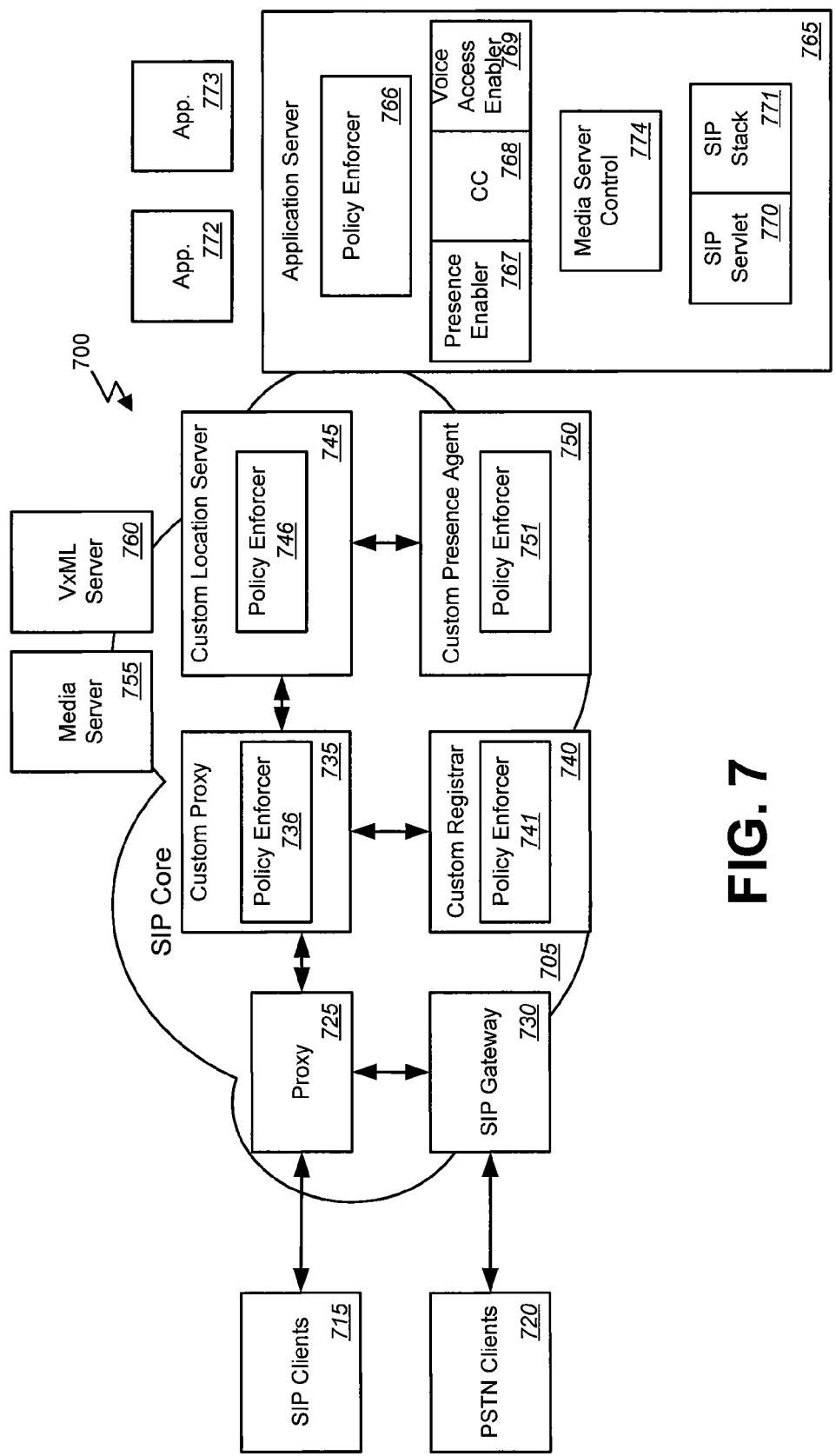
FIG. 7 is a block diagram illustrating functional components of an exemplary system for providing call and dialog control according to one embodiment of the present invention.

FIG. 7 is a block diagram illustrating functional components of an exemplary system for providing call and dialog control according to one embodiment of the present invention. It should be noted that FIG. 7 represents a particular implementation and, as noted above, various other implementations or embodiments of the present invention may be accomplished using different protocols, as well as additional, fewer, and/or different components. The example illustrated in FIG. 7 represents, conceptually, components that may be implemented in an environment such as described above with reference to FIG. 1 or any other suitable environment. In this example, the system 700, as described U.S. patent application Ser. No. 11/383,024 entitled "SIP Routing Customization" filed May 12, 2006 by Maes, the entire disclosure of which is incorporated herein by reference for all purposes, includes a SIP core 705 and a number of clients such as SIP clients 715, Public Switched Telephone Network (PTSN) clients 720, etc. The SIP core 705 can provide access to one or more servers 755-765 and/or can route messages or signals between the clients 715-720 and/or the servers 755-765. As is common, the SIP core 705 can receive messages or signals from the clients via a proxy 725 or, as in the case of PSTN clients, via a SIP gateway 730 and the proxy 725.

According to one embodiment, elements of the system 700 can function as described in the application entitled "SIP Routing Customization" referenced above to route a request, for example from a client 715 or other initiator, to establish a session with a target device or application. According to one embodiment, the application server 765 can receive the request from the client 715. The application server can include one or more modules or components to provide a policy enforcer 766 and presence enabler 767 that function as described in the cited application. Furthermore, the application server 765 can include call control functions 768, a voice access enabler 769, media server control functions 774, a SIP servlet container 770 and a SIP stack 771.

Generally speaking, the call control functions 768 of the application server 765 can be adapted to receive the call from the client 715 or an application 772 or 773, via a SIP invite message handled through the SIP servlet 770 and SIP stack 771. A dialog manager such as VXML server 760 can be invited to participate in the call as described above via a message of the signaling protocol. After inviting the VXML server 760, control of the call can be maintained by the application server 765 or requesting application 772 or 773 and control of the dialog can be passed to the VXML server 760 or other manager. Information collected by the dialog manager from the client 715 can be received by the application server 765 from the VXML server 760. This information can be passed back or made available to the application or application server 765. Additional call control can be performed by the application server 765 or application 772 or 773 based on the information collected from the client 715. For example, the call control functions 768 can be called again.

As noted in the application cross-referenced above, the example illustrated in FIG. 2 assumes that the SIP core can be modified to provide such features. In many cases, the SIP core is provided as part of an existing network or network element and cannot be easily modified. Therefore, the following alternative is presented for adding the features discussed above to an existing SIP implementation without modifying the SIP core.

Figure 8:
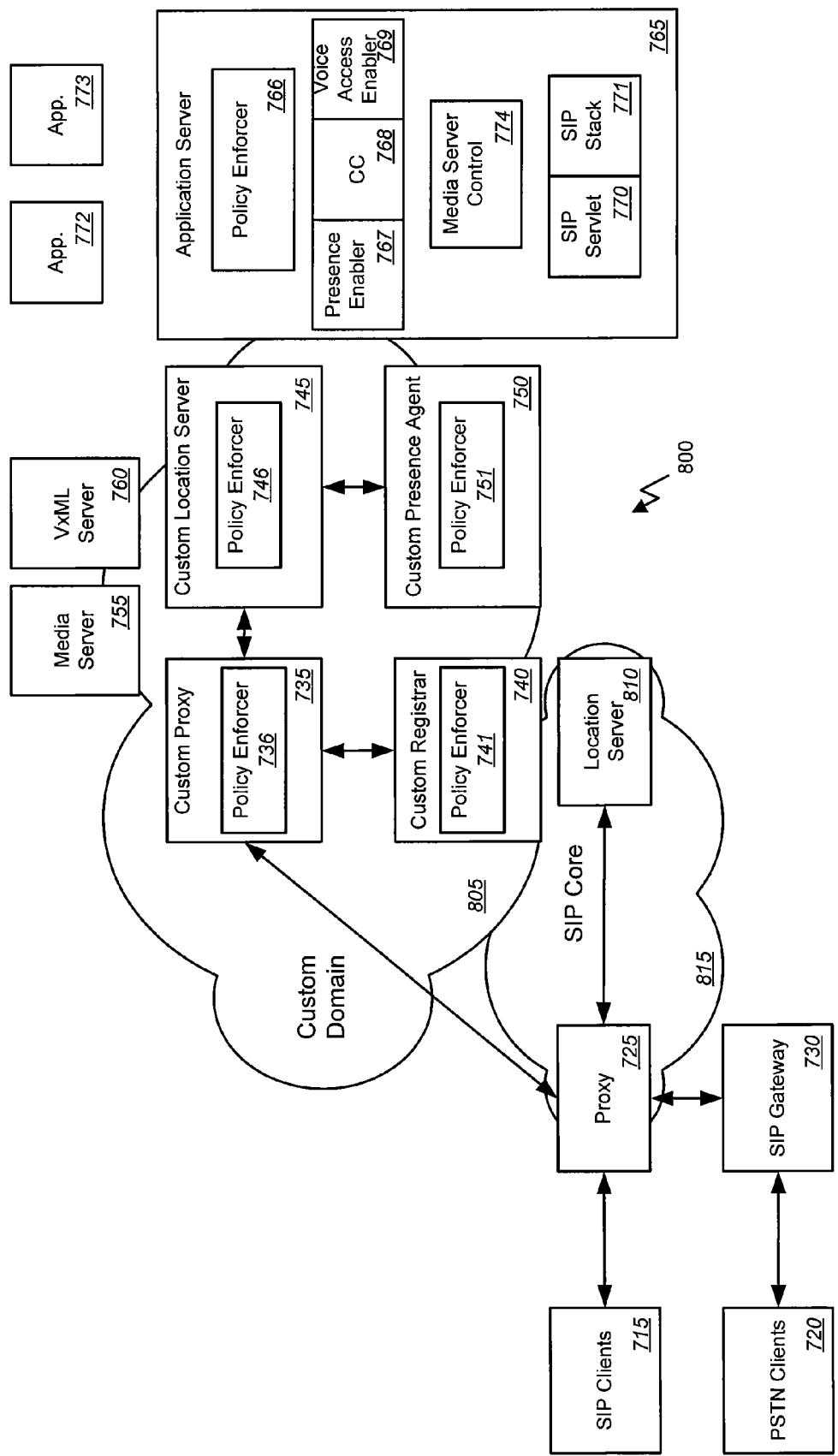
FIG. 8 is a block diagram illustrating functional components of another exemplary system for providing call and dialog control according to an alternative embodiment of the present invention.

FIG. 8 is a block diagram illustrating functional components of another exemplary system for providing call and dialog control according to an alternative embodiment of the present invention. This example illustrates an existing, unmodified SIP core 815. As in the previous example, the system 800 also includes a number of clients such as SIP clients 715, Public Switched Telephone Network (PTSN) clients 720, etc. As is common, the SIP core 815 can receive messages or signals from the clients via a proxy 725 or, as in the case of PSTN clients 720, via a SIP gateway 730 and the proxy 725. Also as is common, the requests can be routed based on AORs discovered and provided by the location server 810.

According to one embodiment, the target SIP URIs stored in or by the location server 810 can include those pointing to a custom domain 805. That is, an target SIP URI can be stored in the SIP core 815 in the conventional manner, i.e., via a SIP registrar. However, rather than pointing to an end device, the target SIP URI can point to the custom domain 805 and cause the proxy 725 of the SIP core to route or redirect the request to the custom domain 805.

The custom domain 805 can include a number of customized components such as a custom proxy 735 and a custom location server 745. The custom domain 805 can further comprise a custom registrar 740 adapted to store one or more addresses of record for the target device or other devices. That is, the custom components, i.e., the custom proxy 735, custom location server 745, custom registrar 740, and custom presence agent 750, for providing custom routing as discussed above can be implemented in the custom domain 805 rather than by modifying the SIP core 815. However, the custom components of the custom domain 805 can then provide the same functions of custom routing as discussed above.

For example, the custom domain can include an application server 765. The application server 765 can include one or more modules or components to provide a policy enforcer 766 and presence enabler 767 that function as described in the cited application. Furthermore, the application server 765 can include a call control functions 768, a voice access enabler 769, media server control functions 774, a SIP servlet container 770 and a SIP stack 771.

Generally speaking, the call control functions 768 of the application server 765 can be adapted to receive the call from the client 715 or an application 772 or 773, via a SIP invite message handled through the SIP servlet 770 and SIP stack 771. A dialog manager such as VXML server 760 can be invited to participate in the call as described above via a message of the signaling protocol. After inviting the VXML server 760, control of the call can be maintained by the application server 765 or requesting application 772 or 773 and control of the dialog can be passed to the VXML server 760 or other manager. Information collected by the dialog manager from the client 715 can be received by the application server 765 from the VXML server 760. This information can be passed back or made available to the application or application server 765. Additional call control can be performed by the application server 765 or application 772 or 773 based on the information collected from the client 715. For example, the call control functions 768 can be called again.

Therefore, the examples illustrated in FIGS. 7 and 8, in use, can allow an application 772 to maintain control of a call or other media session and request execution of a dialog or other media event. For example, the application 772 can maintain control of the session and make a request to the voice access enabler 769 to perform a particular media event, e.g., execute a dialog. The call control functions 768 can in turn establish a call with the VoiceXML server 760, media server 755 or other manager in third-party or multi-party call control between the call control functions 768, the VoiceXML server, and the client 715.

The VoiceXML server 760 can be adapted to collect information from a user of the client 715 and update a state of the dialog based on the information from the user. For example, the VoiceXML server 760 may utilize any of a number of speech engines or other modules to support the dialog with the client 715. It should be understood that, in some embodiments, rather than VoiceXML server 760, any IVR with any IVR programming language and control protocol can be used in place of the VoiceXML server 760.

The application 772 can be further adapted to receive from the VoiceXML server 760, media server 755 or other manager, for example via the voice access enabler 769, information related to a media session or event, e.g., the information collected from the user by the dialog manager. In some cases, the application 772 may perform additional call control, for example via the call control functions 768, and/or request another dialog or media session or event, for example via the voice access enabler 769, based on the information provided by the VoiceXML 760, media server 755 or other manager, processor, or server.

In a more specific example, a voice access enabler 769, in response to a request or action by the application 772, can request a resource like a VoiceXML gateway to play a prompt and/or media supporting a dialog. Additionally or alternatively, the voice access enabler 769 may request a resource like a VoiceXML gateway to record a dialog, run a dialog, collect data though dialog etc. Supported dialogs can include voice or DTMF dialogs such as may be provided by an IVR or the VXML browser or gateway. Such dialogs may be pre-configured, i.e., assigned to an address associated with the application, dynamically configured, i.e., the call and the dialog can be dynamically bound, or can be based on the collected dialog outcome.

According to one embodiment, when supporting DTMF and a DTMF message is presented in a stream or data while not in a dialog, the message can be handled, for example, by the VoiceXML server 760 or media server 755. This can be accomplished, for example when the voice access enabler 769 drives a media server, by pre-programming the behavior of VoiceXML server 760 or media server 755 to answer DTMF. The recognized DTMF can be passed to the application 772 via an interface of the voice access enabler 769 so that the application 772 can then reply by providing instructions on what to do next.

Figure 9:
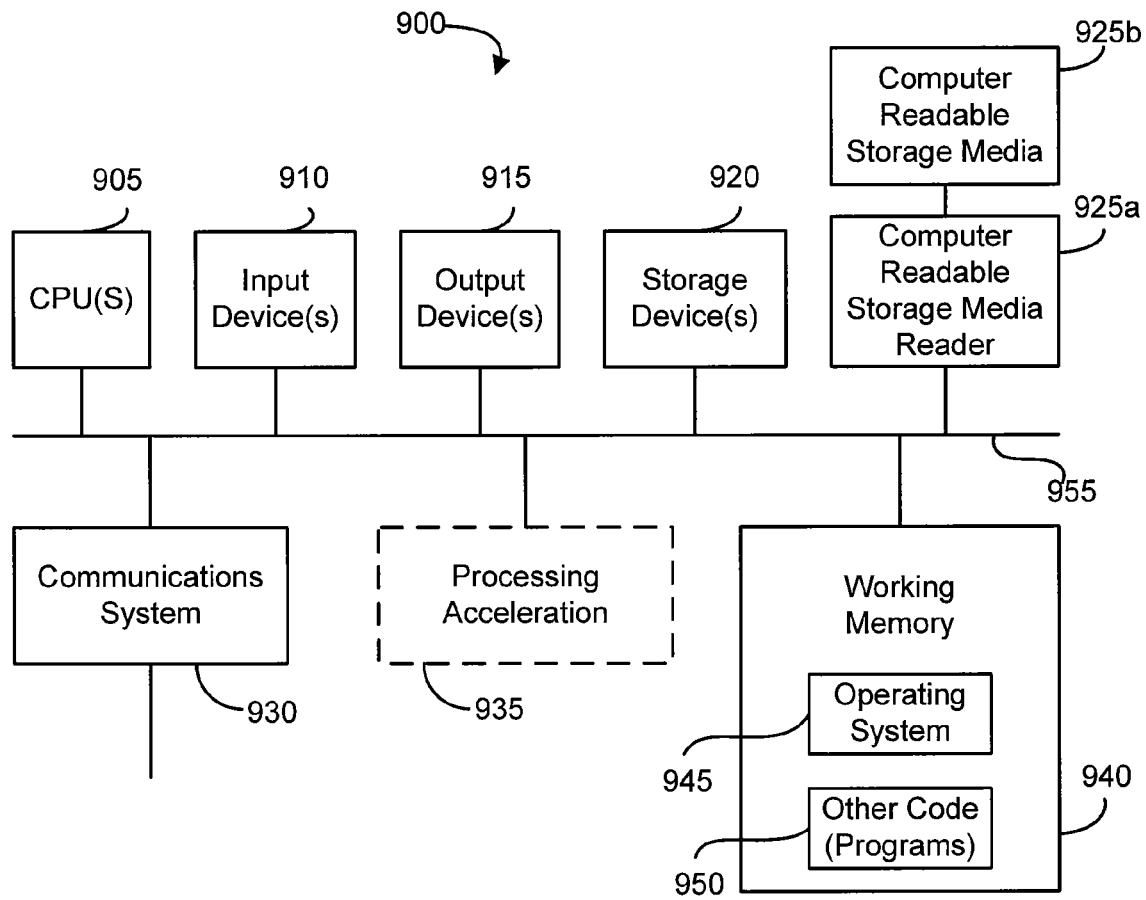
FIG. 9 is a block diagram illustrating an exemplary computer system in which embodiments of the present invention may be implemented.

FIG. 9 illustrates an exemplary computer system 900, in which various embodiments of the present invention may be implemented. The system 900 may be used to implement any of the computer systems described above or below. The computer system 900 is shown comprising hardware elements that may be electrically coupled via a bus 955. The hardware elements may include one or more central processing units (CPUs) 905, one or more input devices 910 (e.g., a mouse, a keyboard, etc.), and one or more output devices 915 (e.g., a display device, a printer, etc.). The computer system 900 may also include one or more storage device 920. By way of example, storage device(s) 920 may be disk drives, optical storage devices, solid-state storage device such as a random access memory ("RAM") and/or a read-only memory ("ROM"), which can be programmable, flash-updateable and/or the like.

The computer system 900 may additionally include a computer-readable storage media reader 925a, a communications system 930 (e.g., a modem, a network card (wireless or wired), an infra-red communication device, etc.), and working memory 940, which may include RAM and ROM devices as described above. In some embodiments, the computer system 900 may also include a processing acceleration unit 935, which can include a DSP, a special-purpose processor and/or the like.

The computer-readable storage media reader 925a can further be connected to a computer-readable storage medium 925b, together (and, optionally, in combination with storage device(s) 920) comprehensively representing remote, local, fixed, and/or removable storage devices plus storage media for temporarily and/or more permanently containing computer-readable information. The communications system 930 may permit data to be exchanged with the network 920 and/or any other computer described above with respect to the system 900.

The computer system 900 may also comprise software elements, shown as being currently located within a working memory 940, including an operating system 945 and/or other code 950, such as an application program (which may be a client application, web browser, mid-tier application, RDBMS, etc.). It should be appreciated that alternate embodiments of a computer system 900 may have numerous variations from that described above. For example, customized hardware might also be used and/or particular elements might be implemented in hardware, software (including portable software, such as applets), or both. Further, connection to other computing devices such as network input/output devices may be employed. Software of computer system 900 may include code 950 for implementing processes for call and dialog control as described herein.

As noted above, embodiments of the present invention include a programming model in which an application keeps control of the call or session (e.g. $3^{rd}$ party call control) and passes control of other aspects of the session such as dialog management or other media processing to other processing modules. Typically, under this model, the dialog management or media server related processing do not perform call control unless control of the call is intentionally passed to those modules by the application. According to one embodiment, a voice access enabler is further provided to abstract dialog or other media control. As introduced above and as will be described below, the voice access enabler may or may not initiate the session, i.e., trigger or begin the initial call control. That is, the voice access enabler can provide the initial invite to initiate the call or session. Then, when the call is received by the application, the call details (e.g. call identifier) can be pass by application to the voice access enabler so that it can be redirected to the media process module or dialog manager, for example, via third party call control. In other cases, when the voice access enabler does not provide the initial invite, the application can either initiate the call between the media processor and end point or react to the incoming call and redirect it in third part call control to the media processor. The application can then pass to the voice access enabler the details of the media processor such as an identifier, address, etc.

Figure 10:
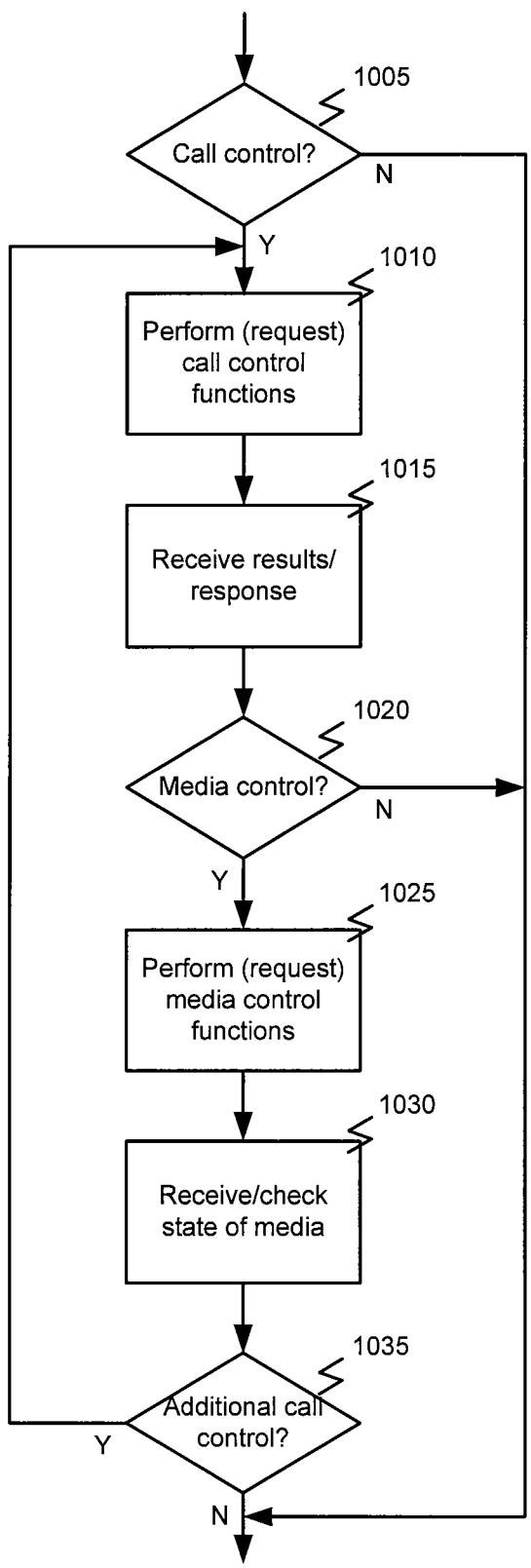
FIG. 10 is a flowchart illustrating a process for call control according to one embodiment of the present invention.

FIG. 10 is a flowchart illustrating a process for call control according to one embodiment of the present invention. This example illustrates processes that may be performed by an application supporting a media exchange as described above.

That is, this example illustrates a process for call control in which the application performs the initial call control. In this example, processing begins with determining 1005 whether to perform call control. As noted above, this determination can be based on the application receiving a communication from an initiating endpoint or based on other processing performed by the application. In response to determining 1005 to perform call control, the call control function can be performed 1010 by the application or requested from call control functions for example via a northbound interface of the call control functions. As noted above, performing call control functions can comprise inviting or otherwise initiating a session between an endpoint, a voice access enabler, and/or another media processing module, for example via third party call control. For example, the application can invite a dialog controller or other media processing module to participate in and support the session. Then, if a voice access enabler is used in the particular implementation, an identifier or address of the dialog manager or other media processing module can be passed to the voice access enabler.

Regardless of how the call control function is performed by the application or the functions, the application can receive 1015 or check results of the function. For example, the application can check whether the function was successfully completed, e.g., a connection was made to a callee. Receiving 1015 the information can be performed via the interface of the functions. Based on results of the call control, the application can make a determination 1020 as to whether to perform media control such as dialog management in a dialog manager, or media server related processing in a media server. In response to determining 1020 to perform media control, the media control function (e.g., start a dialog management or a media server related processing) can be performed 1025 by the application or requested from functions provided by a media processing module such as a voice access enabler or media server control functions, for example via a northbound interface of the voice access enabler. That is, even if requesting media control functions (e.g. from the voice access enabler or media server control functions), the application maintains control of the call or session.

During and/or following performance of the media control functions, the application can receive 1030 and/or check or update a state of the media. For example, the application can check information collected from an endpoint or user via a dialog. Receiving 1030 the information can be performed via the interface of the voice access enabler or media server control functions. Based on such information, the application can determine 1035 whether to perform additional call control or terminate.

Figure 11:
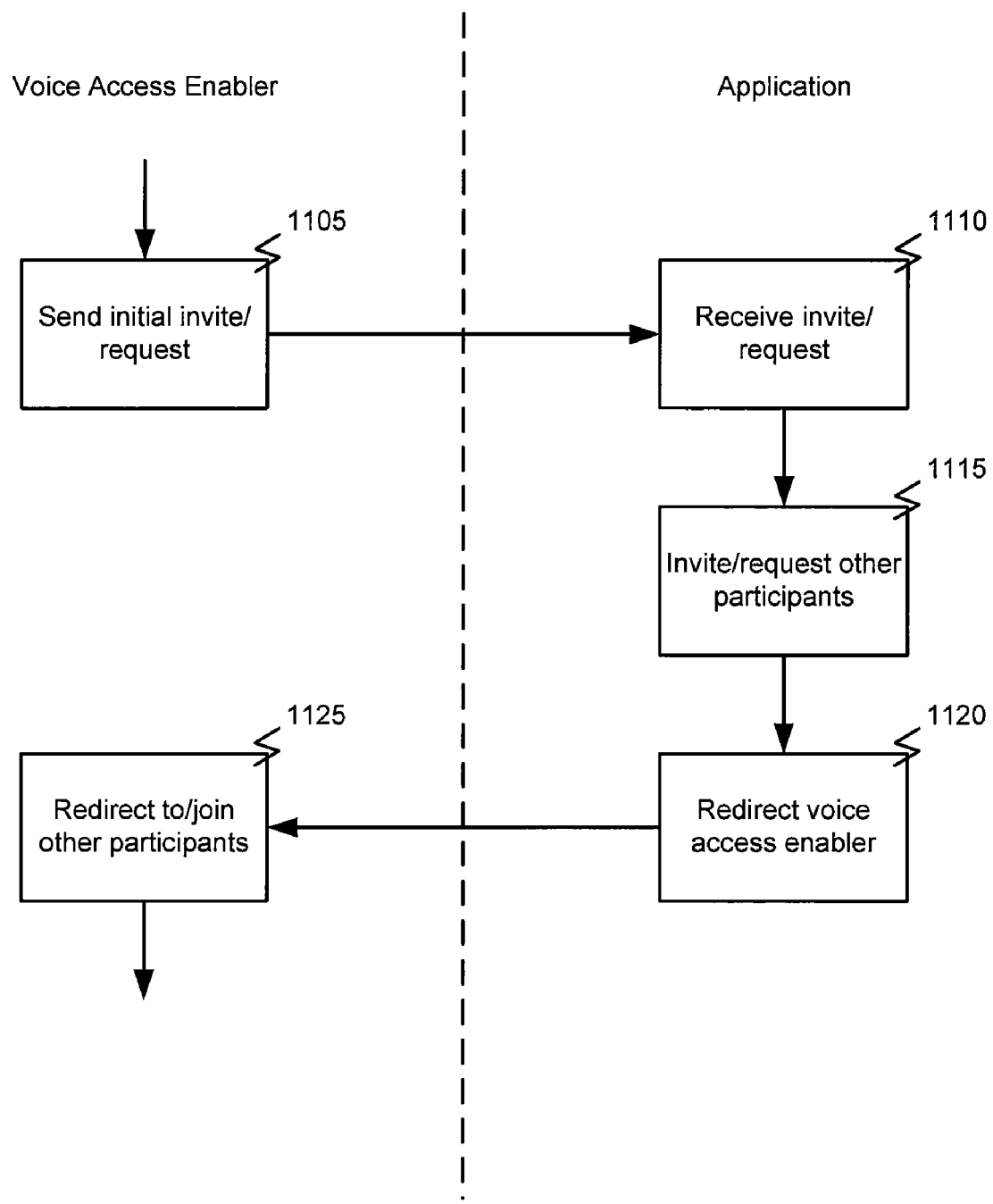
FIG. 11 is a flowchart illustrating a process for call control according to an alternative embodiment of the present invention.

FIG. 11 is a flowchart illustrating a process for call control according to an alternative embodiment of the present invention. This example illustrates processes that may be performed by a voice access enabler and an application when the voice access enabler initiates the call or session. In this example, the voice access enabler can provide the initial invite or other message or request to initiate the call or session. The voice access enabler can send 1105 this message or request to the application. When the message is received 1110 by the application, the application can invite 1115 a dialog manager or other media processing manager to participate in the session, for example via third party call control as described above. Once initiated by the application, the call details (e.g. call identifier) can be passed 1120 by application to the voice access enabler so that it can be redirected 1125 to the media process module or dialog manager, for example, via third party call control, to join or participate in the session.

Figure 12:
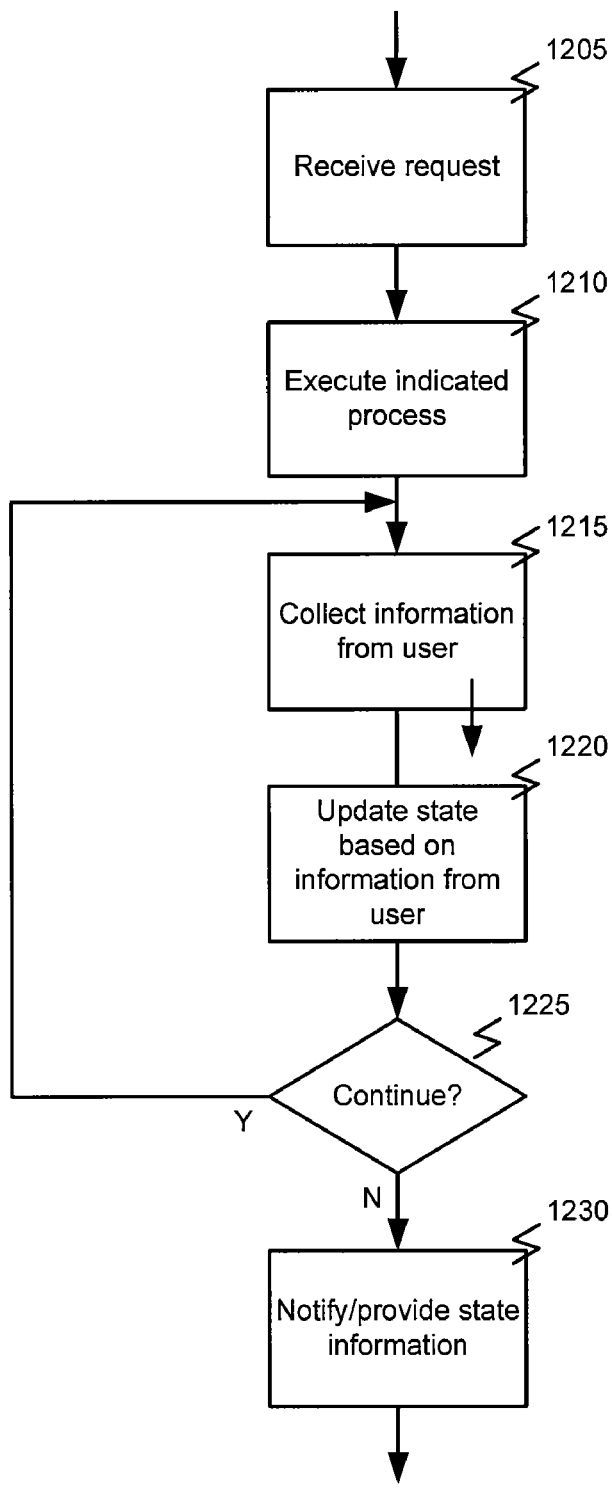
FIG. 12 is a flowchart illustrating a process for dialog control according to one embodiment of the present invention.

FIG. 12 is a flowchart illustrating a process for dialog control according to one embodiment of the present invention. That is, this example illustrates a process that may be performed by a voice access enabler or other media control functions as described above when an application or other module requests dialog or media functions or services. In this example, processing begins with the voice access enabler or media server control function receiving 1205 a request, for example from the application, to execute a dialog or perform another media server processing. As noted above, the request can identify the dialog or process to be executed, for example in an HTTP GET request, in a SIP header, or in another manner or the dialog manager or medias server driven by the voice access enabler or media server control function can obtain that information in other ways (e.g., pre-provisioned, updated after the call/session is established, etc.). The indicated dialog or process can then be executed 1210.

During execution of the dialog or other process, information can be collected 1215, for example from the user of an endpoint or from the process. State information for the dialog or other process can be updated 1220 based on the information collected. Based on the state of the dialog and/or the information collected, a determination 1225 can be made by the voice access enabler or media server control function as to whether to continue the current dialog or process. For example this could be because the voice access enabler executes a backend logic (e.g. JSP) that generates new VoiceXML pages to further execute. If a determination 1225 is made to continue the dialog or process, additional information can be collected 1215 from the user and the state information can be updated 1220. If or when a determination 1225 is made to not continue the current dialog or process (e.g. the whole dialog is complete i.e. all the information required is collected or errors are not recoverable), the requestor, e.g., the application, can be notified 1230 of completion. Optionally, state information can be passed back to the application as part of or separate from the notification. The application can then decide as discussed above with reference to FIG. 10 to forward the call or alternatively it could request more dialog management or another media server processing (e.g. iterating through the voice access enabler or media server control functions rather than forwarding somewhere else).

In summary, while described above in terms of specific examples using specific protocols, embodiments of the present invention are not limited to such implementations. Rather, embodiments of the present invention provide a programming model. The basic programming model includes a controller played by the logic that drives the call or other media session. Control operations for the session are factored out from other interactions done on the media interaction. Accordingly, a call or other media interaction is either received by an application or initiated by an application. In the former case, the application logic reacts to the interaction as appropriate while maintaining control of the session. In the latter case, the application establishes a session while keeping it under control. Both cases can be implemented, for example, by third-party call control where the application remains an intermediary to all the control exchanges and makes each leg believe that the application is the other end point.

Figure 13:
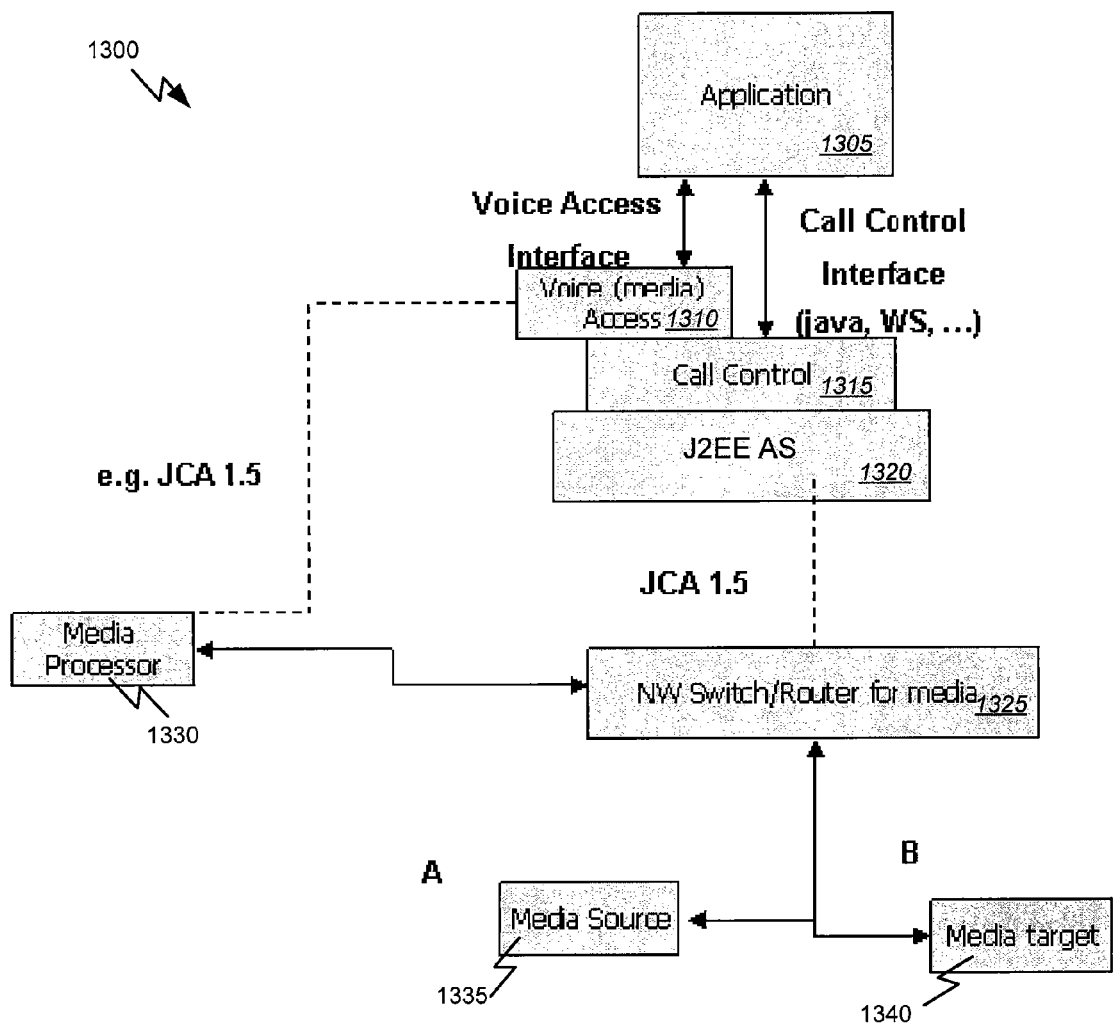
FIG. 13 is a block diagram illustrating components of system for providing a media interaction and control of the interaction according to one embodiment of the present invention.

FIG. 13 is a block diagram illustrating components of system for providing a media interaction and control of the interaction according to one embodiment of the present invention. This example illustrates a summation of the systems described in detail above. More specifically, the system 1300 includes an application server 1320. The application server 1320 can include or be in communication with call control functions 1315. As noted above, in some implementations, the call control functions may instead be implemented by the application rather than a separate controller. As noted above, the voice access enabler 1310 may provide the initial invite or call setup or it may be provided by the application 1305. As shown here both cases are covered with the initial call control setup or invite executable by the voice access enabler 1310 or by the application 1305. Call control other than the initial invite can be done by the application 1305.

The call control functions 1315 can be adapted to receive a notification of a communication from an initiating device or media source 1335. For example, the notification of the communication from the media source 1335 can be received via an Application Program Interface (API) of call control functions 1315. The notification can be communicated by one or more network switches or routers 1325. The network switches or routers 1325 can be any technology like IN, PSTN, SIP, IMS, PBX, IP PBX, etc as can be understood by those skilled in the art.

In other cases, the application 1305, rather than reacting to a media interaction, e.g., a call from the media source 1335 or other element of the system, may initiate an interaction. For example, the application 1305 may determine to initiate an interaction with the media source 1335 and/or media processor 1330. In another example, the application may determine to initiate an interaction between the media source 1335 and the media target 1340 that may also involve the media processor 1330. Other combinations of interactions, as can be understood by one skilled in the art, are contemplated and are considered to be within the scope of the present invention.

According to one embodiment, the application server 1320 may include or be in communication with a voice access enabler 1310 or other media server control functions. The voice access enabler 1310 may also be in communication with the dialog manager or media processor 1330 and the media server control functions with the media server. For example, the media processor 1330 can comprise a VoiceXML gateway, IVR or other components as described above. An application 1305 in communication with or executing on the application server 1320 can initiate or respond to a session, for example, initiated by the media source 1335. The application 1305 can perform call control and request media services though the voice access enabler 1310, the call control functions 1315, and/or other media server control functions. That is, the application may invoke or access the functions provided by the call control functions 1315 and/or the voice access enabler 1310 or media server control functions via one or more northbound interfaces provided by the enablers as described above.

Either in reaction to the session or when initiating the session, the application 1305 can forward a portion of the session in third-party call control to another module, such as the media processor 1330 (e.g. dialog manager or media server), that will in turn be responsible for processing that portion of the session. For example, the application 1305 can receive a call or other communication from the media source 1335. In another example, the application may determine to start a session based on its processing. In either event, the application 1305 can make a request for the services provided by the media processor 1330 such as, for example, dialog control. The application 1305 can make this request through the call control functions 1315 and/or the voice access enabler 1310 or media server control functions via northbound interfaces provided by the enabler or functions as described in detail above.

Throughout the processing of the media by the media processor or upon completion of the processing by it, the application 1305 can receive updates, for example via the interfaces of the voice access enabler 1310 or other media server control functions 1310 as described in detail above. At some point the application 1305 can determine that the session can be processed by another module, such as the media source 1335, media target 1340, or yet another processing module not shown here. Such a module may, for example, involve a media interaction with the media target 1340. In such a case, determination of a next module or processing the results can be based on action taken by the target 1340. The process of the application 1305 controlling the session through the call control functions 1315 and/or accessing media functions via the voice access enabler 1310 or other media server control functions can be repeated based on the logic of the application 1305 and results of the processing by other modules until the session is terminated or handed over to another application to handle any further processing.

Thus, following the principles of the proposed programming model, the modules need not perform call control operations. These operations can instead be performed by the application logic. In other cases, the application may, if intentionally programmed to do so, give up or pass control of the call to other modules. Since call control can be factored out from dialog or other media exchange operations, an enabler responsible for providing the application interfaces and abstraction of technology can perform the media exchange management operation such as dialog management. As noted above, the underlying technologies supporting signaling, control, media exchanges, etc can therefore vary depending upon the implementation. Therefore, embodiments of the present invention should not be considered to be limited to use with any specific technologies, protocols, formats, etc. Rather, enabler can be utilized to access these resources and/or functions via any mechanism appropriate for the resource.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of controlling a media session, the method comprising:
establishing with an application executing on a web application server a call with at least one endpoint device via a signaling protocol;
maintaining control of the call with the application, wherein maintaining control of the call with the application comprises performing call processing and call control functions other than signaling and initiating the call;

passing control of aspects of the call other than call control from the application to a separate first media processing module without passing control of the call from the application to the first media processing module, wherein the first media processing module collects information from an endpoint participating in the call and updates a state of the media based on the information from the endpoint; and performing by the application additional call control based on the updated state of the media and the information collected from the endpoint participating in the call.

2. The method of claim 1, wherein establishing the call is performed in response to receiving a request via the signaling protocol from an initiating endpoint to initiate the call.

3. The method of claim 1, wherein establishing the call is performed based on logic of an application maintaining control of the call.

4. The method of claim 3, wherein the application maintaining control of the call establishes the call by performing one or more call control functions.

5. The method of claim 4, wherein the one or more call control functions comprise establishing a connection with the first media processing module.

6. The method of claim 5, wherein establishing a connection with the first media processing module is performed via third-party call control.

7. The method of claim 5, wherein establishing a connection with the first media processing module is performed via multi-party call control.

8. The method of claim 7, wherein performing one or more call control functions requesting the one or more call control functions via an Application Program Interface (API).

9. The method of claim 8, wherein the API comprises a Parlay Call Control API.

10. The method of claim 1, further comprising receiving a request from a voice access enabler and wherein establishing the call is performed in response to a request from a voice access enabler.

11. The method of claim 10, wherein receiving the request from the voice access enabler comprises receiving the request via a northbound interface of the voice access enabler.

12. The method of claim 1, wherein passing control of aspects of the call other than call control to the first media processing module comprises requesting execution of a process of the first media processing module via an Application Program Interface (API) of a voice access enabler.

13. The method of claim 1, wherein the first media processing module comprises a dialog manager and requesting execution of a process of the first media processing module comprises requesting execution of a dialog by the dialog manager.

14. The method of claim 13, wherein requesting execution of the dialog by the dialog manager comprises sending a message to the dialog manager via the signaling protocol, the message identifying the dialog in a header of the message.

15. The method of claim 13, further comprising executing a dialog associated with a port through which execution of the dialog is requested.

16. The method of claim 15, further comprising executing a pre-loaded dialog.

17. The method of claim 13, wherein requesting execution of the dialog by the dialog manager comprises invoking a function of the dialog manager via an Application Program Interface (API) of a voice access enabler.

18. The method of claim 17, wherein the API of the voice access enabler provides access to a function of the dialog manager for interacting with a human user participating in the call.

19. The method of claim 17, wherein the API of the voice access enabler provides access to a function of the dialog manager for providing voice prompts to participants in the call.

20. The method of claim 17, wherein the API of the voice access enabler provides access to a Text-To-Speech (TTS) function of the dialog manager.

21. The method of claim 17, wherein the API of the voice access enabler provides access to a Automatic Speech Recognition (ASR) function of the dialog manager.

22. The method of claim 17, wherein the API of the voice access enabler provides access to a function of the dialog manager for performing Dual-Tone Multi-Frequency (DTMF) signaling.

23. The method of claim 13, wherein the dialog manager comprises a Voice eXtensible Markup Language (VoiceXML) gateway.

24. The method of claim 13, wherein the dialog manager comprises an Interactive Voice Response (IVR) system.

25. The method of claim 1, wherein updating the state of the media based on the information from the endpoint comprises updating a state of a dialog.

26. The method of claim 1, further comprising receiving from the first media processing module the information collected from the endpoint participating in the call.

27. The method of claim 26, wherein receiving from the first media processing module the information collected from the endpoint participating in the call comprises receiving the information via an Application Program Interface of a voice access controller.

28. The method of claim 1, wherein the signaling protocol comprises Session Initiation Protocol (SIP).

29. The method of claim 1, wherein the call control functions comprise third-party call control functions.

30. The method of claim 1, wherein the call control functions are selected from a group consisting of: call forwarding; call hold; and conferencing.

31. The method of claim 1, wherein performing additional call control functions comprises passing control of aspects of the call other than call control from the application to a separate second media processing module without passing control of the call from the application to the second media processing module.

32. A system comprising:
a communication network;
a first media processing module communicatively coupled with the communication network; and
a web application server communicatively coupled with the communication network and executing an application adapted to establish a communication session with at least one endpoint on the communication network via a signaling protocol, maintain control of the communication session, wherein maintaining control of the call with the application comprises performing call processing and call control functions other than signaling, pass control of aspects of the communication session other than call control to the first media processing module while not passing call control for the communication session to the first media processing module, wherein the first media processing module collects information from an endpoint participating in the call and updates a state of the media based on the information from the endpoint, and the web application server further performs additional call control based on the updated state of the media and the information collected from the endpoint participating in the call.

33. The system of claim 32, further comprising an initiating endpoint communicatively coupled with the communication network and wherein the application establishes the communication session in response to receiving a request to initiate the communication session via the signaling protocol from the initiating endpoint.

34. The system of claim 32, wherein the application is adapted to establish the communication session by performing one or more call control functions.

35. The system of claim 34, wherein the one or more call control functions comprise establishing a connection with the first media processing module.

36. The system of claim 35, wherein the application establishes a connection with the first media processing module via third-party call control.

37. The system of claim 35, wherein the application establishes a connection with the first media processing module via multi-party call control.

38. The system of claim 32, further comprising a voice access enabler communicatively coupled with the communication network, wherein the voice access enabler provides an Application Program Interface (API) and wherein the application passes control of aspects of the call other than call control to the first media processing module by requesting execution of a process of the first media processing module via the API of the voice access enabler.

39. The system of claim 38, wherein the first media processing module comprises a dialog manager and requesting execution of a process of the first media processing module comprises requesting execution of a dialog by the dialog manager via the API of the voice access enabler.

40. The system of claim 39, wherein the API of the voice access enabler provides access to a function of the dialog manager for performing Dual-Tone Multi-Frequency (DTMF) signaling.

41. The system of claim 32, wherein the first media processing module comprises a dialog manager and requesting execution of a process of the first media processing module comprises requesting execution of a dialog by the dialog manager.

42. The system of claim 41, wherein the application requests execution of the dialog by the dialog manager by sending a message to the dialog manager via the signaling protocol, the message identifying the dialog in a header of the message.

43. The system of claim 41, wherein the dialog manager is adapted to execute a dialog associated with a port through which the application requests execution of the dialog.

44. The system of claim 41, wherein the dialog manager is adapted to execute a pre-loaded dialog.

45. The system of claim 39, wherein the dialog controller comprises a Voice eXtensible Markup Language (VoiceXML) gateway.

46. The system of claim 41, wherein the dialog controller comprises an Interactive Voice Response (IVR) system.

47. The system of claim 41 wherein the API of the voice access enabler provides access to a function of the dialog manager for interacting with a human user participating in the call.

48. The system of claim 41, wherein the API of the voice access enabler provides access to a function of the dialog manager for providing voice prompts to participants in the call.

49. The system of claim 41, wherein the API of the voice access enabler provides access to a Text-To-Speech (TTS) function of the dialog manager.

50. The system of claim 41, wherein the API of the voice access enabler provides access to a Automatic Speech Recognition (ASR) function of the dialog manager.

51. The system of claim 32, wherein the application is further adapted to receive from the first media processing module the information collected from the endpoint.

52. The system of claim 51, further comprising a voice access enabler communicatively coupled with the communication network, wherein the voice access enabler provides an Application Program Interface (API) and wherein the application is further adapted to receive from the first media processing module the information collected from the endpoint via the API of the voice access enabler.

53. The system of claim 32, wherein the signaling protocol comprises Session Initiation Protocol (SIP).

54. The system of claim 32, wherein the call control functions comprise third-party call control functions.

55. The system of claim 54, wherein the call control functions comprise a call forwarding function.

56. The system of claim 55, wherein the call control functions comprise a call hold function.

57. The system of claim 56, wherein the call control functions comprise a conferencing function.

58. The system of claim 32, wherein the web application server comprises a J2EE application server.

59. The system of claim 58, wherein the web application server is implemented on a Service Delivery Platform (SDP).

60. The system of claim 59, wherein the web application server further provides web elements to the media session.

61. The system of claim 32, further comprising a second media processing module communicatively coupled with the communication network and wherein the web application server performs additional call control functions by passing control of aspects of the call other than call control from the application to the second media processing module without passing control of the call from the application to the second media processing module.

* * * * *

UNITED STATES PATENT AND TRADEMARK OFFICE
CERTIFICATE OF CORRECTION

PATENT NO. : 8,214,503 B2
APPLICATION NO. : 11/848347
DATED : July 3, 2012
INVENTOR(S) : Maes Page 1 of 1

It is certified that error appears in the above-identified patent and that said Letters Patent is hereby corrected as shown below:

On the Title page, Item (57), under "Abstract", line 12, before "an" delete "a".

In column 1, line 10, delete "Media" and insert -- Multimedia --, therefor.

In column 8, line 43, before "can" delete "may".

In column 12, line 39, delete "TVR" and insert -- IVR --, therefor.

In column 12, line 54, delete "TVR" and insert -- IVR --, therefor.

In column 12, line 55, delete "TVR," and insert -- IVR, --, therefor.

In column 12, line 59, delete "TVR" and insert -- IVR --, therefor.

In column 14, line 22, delete "i.e." and insert -- i.e., --, therefor.

In column 15, line 26, delete "(PTSN)" and insert -- (PSTN) --, therefor.

In column 16, line 12, delete "(PTSN)" and insert -- (PSTN) --, therefor.

In column 26, line 1, in Claim 45, delete "39," and insert -- 41, --, therefor.

Signed and Sealed this
Fourth Day of December, 2012

David J. Kappos
*Director of the United States Patent and Trademark Office*